US009154971B2

(12) United States Patent
Aldana et al.

(10) Patent No.: US 9,154,971 B2
(45) Date of Patent: Oct. 6, 2015

(54) METHODS AND SYSTEMS FOR ENHANCED ROUND TRIP TIME (RTT) EXCHANGE

(71) Applicant: QUALCOMM Incorporated, San Diego, CA (US)

(72) Inventors: Carlos Horacio Aldana, Mountain View, CA (US); Sandip Homchaudhuri, San Jose, CA (US); Xin He, Sunnyvale, CA (US); Xiaoxin Zhang, Sunnyvale, CA (US); Ashish Kumar Shukla, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 38 days.

(21) Appl. No.: 13/794,543

(22) Filed: Mar. 11, 2013

(65) Prior Publication Data

US 2014/0160959 A1 Jun. 12, 2014

Related U.S. Application Data

(60) Provisional application No. 61/735,469, filed on Dec. 10, 2012.

(51) Int. Cl.
| | | |
|---|---|---|
| *H04J 3/06* | (2006.01) | |
| *H04W 24/00* | (2009.01) | |
| *H04L 12/26* | (2006.01) | |
| *G01S 5/14* | (2006.01) | |
| *H04W 64/00* | (2009.01) | |

(52) U.S. Cl.
CPC ............... *H04W 24/00* (2013.01); *G01S 5/14* (2013.01); *H04L 43/0864* (2013.01); *H04W 64/003* (2013.01)

(58) Field of Classification Search
USPC ................... 370/311, 252, 350, 503
See application file for complete search history.

(56) References Cited

U.S. PATENT DOCUMENTS

| | | | |
|---|---|---|---|
| 7,953,022 B2 | 5/2011 | Chun et al. | |
| 8,072,895 B2 | 12/2011 | Seok | |
| 2009/0073975 A1 | 3/2009 | Shimonishi | |
| 2010/0067393 A1 | 3/2010 | Sakimura et al. | |
| 2010/0153804 A1 | 6/2010 | Cai et al. | |
| 2010/0278060 A1 | 11/2010 | Lee et al. | |
| 2012/0129551 A1 | 5/2012 | Islam | |
| 2012/0133558 A1* | 5/2012 | Fretenburg et al. ........... 342/378 |
| 2012/0163261 A1 | 6/2012 | Vedantham et al. | |
| 2012/0306692 A1 | 12/2012 | Werner | |

OTHER PUBLICATIONS

Aldana C, "802.11-2012 CID 46 47 48 ; 11-12-1249-02-000m-802-11-2012-cid-46-47-48", IEEE SA Mentor; 11-12-1249-02-000M-802-11-2012-CID-46-47-48, IEEE-SA Mentor; Piscataway, NJ USA, vol. 802.11m, No. 2, Nov. 15, 2012, pp. 1-17, XP068040036.

(Continued)

*Primary Examiner* — Dady Chery
(74) *Attorney, Agent, or Firm* — Berkeley Law & Technology Group, LLP

(57) ABSTRACT

Disclosed are systems, methods and devices for obtaining round trip time measurements for use in location based services. In particular implementations, a fine timing measurement request message wirelessly transmitted by a first transceiver device to a second transceiver device may permit additional processing features in computing or applying a signal round trip time measurement. Such a signal round trip time measurement may be used in positioning operations.

59 Claims, 14 Drawing Sheets

(56) References Cited

OTHER PUBLICATIONS

Partial International Search Report—PCT/US2013/070101—ISA/EPO—Feb. 21, 2014.

International Search Report and Written Opinion—PCT/US2013/070101—ISA/EPO—May 14, 20014.

* cited by examiner

|  | Category | Action | Trigger | Min delta T | Timeout | Frames Per Burst | Burst Period |
|---|---|---|---|---|---|---|---|
| Bits: | 8 | 8 | 8 | 16 | 8 | 8 | 16 |

FIG. 4

|  | Category | Action | Trigger | Min_delta_T_OK | Frames Per Burst | Burst Period OK |
|---|---|---|---|---|---|---|
| Bits: | 8 | 8 | 8 | 1 | 8 | 1 |

FIG. 5

| Category | Action | Dialog Token | Follow Up Dialog Token | TOD | TOA |
|---|---|---|---|---|---|
| 8 | 8 | 8 | 8 | 48 | 48 |
| Bits: | | | | | |

| Max TOD Error | Max TOA Error | Trigger | Min_delta_T_OK | Frames per Burst | Burst Period OK |
|---|---|---|---|---|---|
| 16 | 16 | 8 | 1 | 8 | 1 |
| Bits: | | | | | |

FIG. 7A

|  | Category | Action | Trigger | RTT |
|---|---|---|---|---|
| Bits: | 8 | 8 | 8 | 16 |

FIG. 9A

METHODS AND SYSTEMS FOR ENHANCED ROUND TRIP TIME (RTT) EXCHANGE

This patent application claims benefit of and priority to U.S. Provisional Patent Application 61/735,469, filed Dec. 10, 2012, entitled, "Methods and Systems for Enhanced Round Trip Time (RTT) Exchange", and which is assigned to assignee hereof and, in its entirety, hereby incorporated by reference herein.

BRIEF DESCRIPTION

1. Field

Embodiments described herein are directed to obtaining measurements of signals acquired from a mobile transmitter.

2. Information

Satellite positioning systems (SPSs), such as the global positioning system (GPS), have enabled navigation services for mobile handsets in outdoor environments. Likewise, particular techniques for obtaining estimates of positions of mobile device in indoor environments may enable enhanced location based services in particular indoor venues such as residential, governmental or commercial venues. For example, a range between a mobile device and a transceiver positioned at fixed location may be measured based, at least in part, on a measurement of a round trip time (RTT) measured between transmission of a first message from a first device to a second device and receipt of a second message at the first device transmitted in response to the request message.

BRIEF DESCRIPTION OF THE DRAWINGS

Non-limiting and non-exhaustive aspects are described with reference to the following figures, wherein like reference numerals refer to like parts throughout the various figures unless otherwise specified.

FIG. 4 is a diagram showing fields in a fine timing measurement request frame according to an embodiment.

FIG. 5 is a diagram showing fields in a fine timing measurement acknowledgement frame according to an embodiment.

FIG. 7A is a diagram showing fields in a hybrid fine timing measurement acknowledgement frame according to an embodiment.

FIG. 9A a diagram showing fields of a fine timing round trip time (RTT) feedback frame according to an embodiment.

SUMMARY

Figure 1:
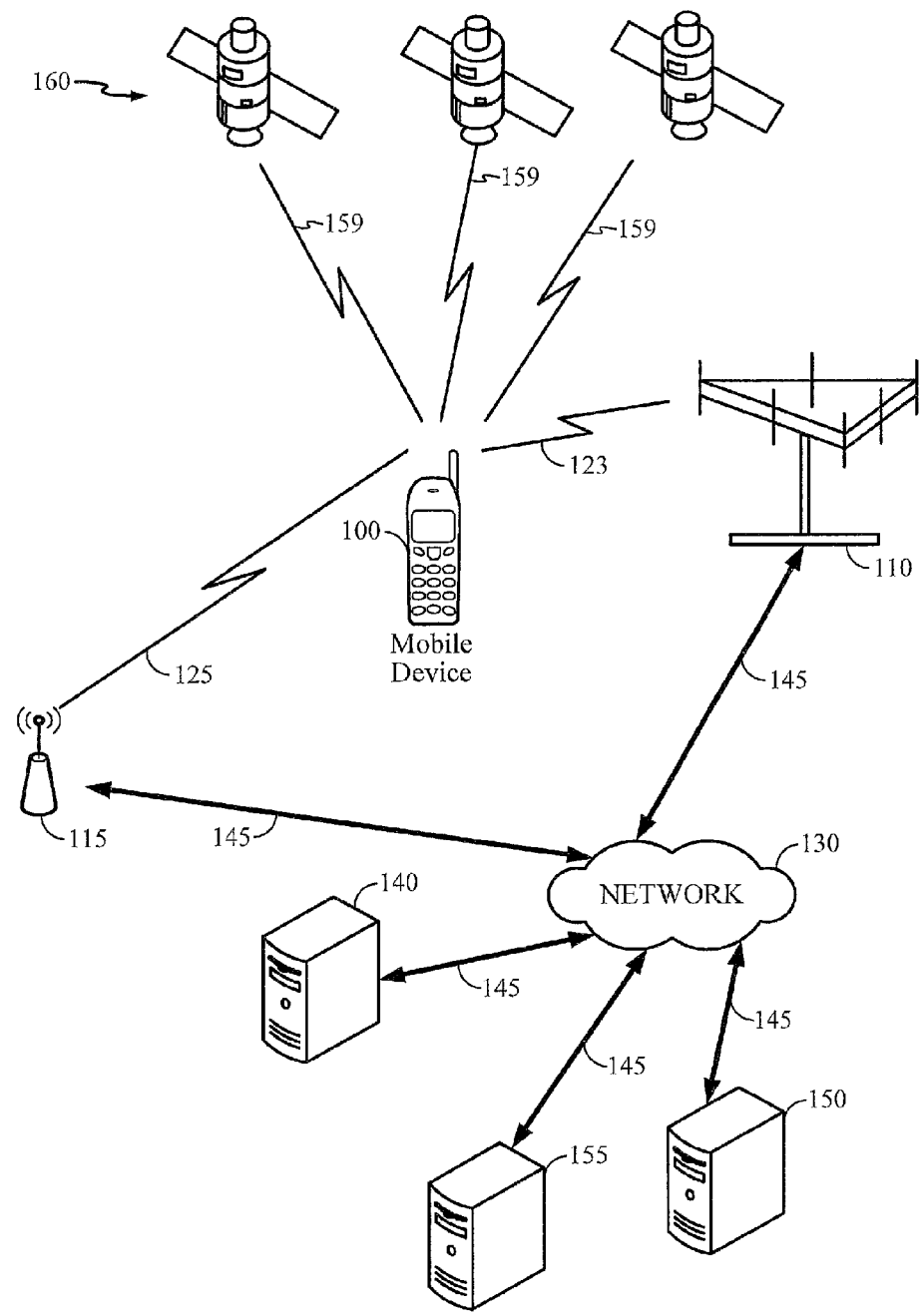
FIG. 1 is a system diagram illustrating certain features of a system containing a mobile device, in accordance with an implementation.

Briefly, particular implementations are directed to a method comprising, at a first transceiver device: wirelessly transmitting from said first transceiver device to a second transceiver device a fine timing measurement request frame comprising one or more values defining a minimum time between transmission of consecutive fine timing measurement frames by said second transceiver device; and wirelessly receiving, from said second transceiver device, one or more fine timing measurement frames based, at least in part, on said one or more values.

Another particular implementation is directed to an apparatus comprising: a transceiver to wirelessly transmit and receive frames; and one or more processors to: initiate wireless transmission from a first transceiver device to a second transceiver device a fine timing measurement request frame comprising one or more values defining a minimum time between transmission of consecutive fine timing measurement frames by said second transceiver device; and obtain one or more fine timing measurement frames wirelessly received from said second transceiver device based, at least in part, on said one or more values.

Another particular implementation is directed to an article comprising: a non-transitory storage medium comprising machine-readable instructions stored thereon which are executable by a special purpose computing apparatus of a first transceiver device to: initiate wireless transmission from said first transceiver device to a second transceiver device a fine timing measurement request frame comprising one or more values defining a minimum time between transmission of consecutive fine timing measurement frames by said second transceiver device; and obtain one or more fine timing measurement frames based, at least in part, on said one or more values received from said second transceiver device.

Another particular implementation is directed to an apparatus comprising: means for wirelessly transmitting from a first transceiver device to a second transceiver device a fine timing measurement request frame comprising one or more values defining a minimum time between transmission of consecutive fine timing measurement frames by said second transceiver device; and means for wirelessly receiving, from said second transceiver device, one or more fine timing measurement frames based, at least in part, on said one or more values.

Another particular implementation is directed to a method comprising, at a first transceiver device: wirelessly receiving at said first transceiver device a fine timing measurement request frame transmitted by a second transceiver device, the fine timing measurement request frame comprising one or more values specifying at least a minimum time between consecutive transmissions of fine timing measurement frames; and wirelessly transmitting, by said first transceiver device to said second transceiver device, at least a fine timing measurement acknowledgment frame in response to receipt of the fine timing measurement request frame.

Another particular implementation is directed to a first wireless station comprising: a transceiver to wirelessly transmit and receive frames; and one or more processors to: obtain a fine timing measurement request frame wirelessly received at said transceiver and transmitted by a second wireless station, the fine timing measurement request frame comprising one or more values specifying at least a minimum time between consecutive transmissions of fine timing measurement frames; and initiate wirelessly transmission through said transceiver to said second wireless station of at least a fine timing measurement acknowledgment frame in response to receipt of the fine timing measurement request frame.

Another particular implementation is directed to an article comprising: a non-transitory storage medium comprising machine readable instructions stored there which are executable by a special purpose computing apparatus of a first wireless station to: obtain a fine timing measurement request frame wirelessly received at said first wireless station and transmitted by a second wireless station, the fine timing measurement request frame comprising one or more values specifying at least a minimum time between consecutive transmissions of fine timing measurement frames; and initiate wirelessly transmission to said second wireless station of at least a fine timing measurement acknowledgment frame in response to receipt of the fine timing measurement request frame.

Another particular implementation is directed to an apparatus comprising, at a first transceiver device: means for wirelessly receiving at said first transceiver device a fine timing measurement request frame transmitted by a second transceiver device, the fine timing measurement request frame comprising one or more values specifying at least a minimum time between consecutive transmissions of fine timing measurement frames; and means for wirelessly transmitting, by said first transceiver device to said second transceiver device, at least a fine timing measurement acknowledgment frame in response to receipt of the fine timing measurement request frame.

Another particular implementation is directed to a method comprising: wirelessly transmitting from a first transceiver device to a second transceiver device a fine timing measurement request frame; wirelessly receiving, at said first transceiver device from said second transceiver device in response to said fine timing measurement request frame, one or more fine timing measurement frames comprising measurements; computing a signal round trip time (RTT) measurement based, at least in part, on said measurements; and wirelessly transmitting from said first transceiver device to said second transceiver device said computed signal RTT measurement.

Another particular implementation is directed to a first wireless station comprising: a transceiver to wirelessly receive and wirelessly transmit frames; and one or more processors to: initiate wireless transmission through said transceiver to a second wireless station a fine timing measurement request frame; obtain one or more fine timing measurement frames comprising measurements wirelessly received at said first wireless station and transmitted from said second wireless station in response to said fine timing measurement request frame; compute a signal round trip time (RTT) measurement based, at least in part, on said measurements; and initiate wireless transmission through said transceiver to said second wireless station said computed signal RTT measurement.

Another particular implementation is directed to an article comprising: a non-transitory storage medium comprising machine-readable instructions stored thereon which are executable by a special purpose computing apparatus of a first wireless station to: initiate wireless transmission of a fine timing measurement request frame to a second wireless station; obtain one or more fine timing measurement frames comprising measurements wirelessly received at said first wireless station and transmitted from said second wireless station in response to said fine timing measurement request frame; compute a signal round trip time (RTT) measurement based, at least in part, on said measurements; and initiate wireless transmission to said second wireless station said computed signal RTT measurement.

Another particular implementation is directed to a first transceiver device comprising: means for wirelessly transmitting from said first transceiver device to a second transceiver device a fine timing measurement request frame; means for wirelessly receiving, from said second transceiver device in response to said fine timing measurement request frame, one or more fine timing measurement frames comprising measurements; means for computing a signal round trip time (RTT) measurement based, at least in part, on said measurements; and means for wirelessly transmitting from said first transceiver device to said second transceiver device said computed signal RTT measurement.

Another particular implementation is directed to a method comprising: wirelessly receiving from a first transceiver device a fine timing measurement request frame at a second transceiver device; wirelessly transmitting, from said second transceiver device to said first transceiver device, one or more messages comprising timing measurements; and wirelessly receiving, at said second transceiver device from said first transceiver device, one or more messages comprising a round trip time (RTT) measurement computed based, at least in part, on said timing measurements.

Another particular implementation is directed to a first wireless station comprising: a transceiver to wirelessly receive and wirelessly transmit frames; and one or more processors to: obtain a fine timing measurement request frame wirelessly received at said transceiver from a second wireless station; initiate wireless transmission one or more messages comprising timing measurements through said transceiver to said second wireless station; and obtain one or more messages comprising an RTT measurement computed based, at least in part, on said timing measurements wirelessly received at said transceiver from said second wireless station.

Another particular implementation is directed to an article comprising: a non-transitory storage medium comprising machine-readable instructions stored thereon which are executable by a special purpose computing apparatus of a first wireless station to: obtain a fine timing measurement request frame wirelessly received from a second wireless station; initiate wireless transmission one or more messages comprising timing measurements to said second wireless station; and obtain one or more messages comprising a round trip time (RTT) measurement computed based, at least in part, on said timing measurements wirelessly received from said second wireless station.

Another particular implementation is directed to an apparatus comprising: means for wirelessly receiving from a first transceiver device a fine timing measurement request frame at a second transceiver device; means for wirelessly transmitting, from said second transceiver device to said first transceiver device, one or more messages comprising timing measurements; and means for wirelessly receiving, at said second transceiver device from said first transceiver device, one or more messages comprising a round trip time measurement computed based, at least in part, on said timing measurements.

It should be understood that the aforementioned implementations are merely example implementations, and that claimed subject matter is not necessarily limited to any particular aspect of these example implementations.

DETAILED DESCRIPTION

As discussed below, particular message flows may enable effective and efficient measurements of a round trip time (RTT) in connection with a transmission of messages between wireless stations (STAs). In a particular example, a STA may comprise any one of several types of transceiver devices such as, for example, a mobile user station (e.g., smartphone, notebook computer, tablet computer, etc.) or wireless service access device (e.g., wireless local area network (WLAN) access point or femto cell). Particular message flows and fields in messages frames may enable obtaining RTT measurements in sufficient accuracy for measuring a range between the wireless STAs using fewer messages, for example. Such a measured range may be used in any one of several applications including positioning operations, for example.

In certain implementations, as shown in FIG. 1, a mobile device 100 may receive or acquire satellite positioning system (SPS) signals 159 from SPS satellites 160. In some embodiments, SPS satellites 160 may be from one global navigation satellite system (GNSS), such as the GPS or Galileo satellite systems. In other embodiments, the SPS Satellites may be from multiple GNSS such as, but not limited to, GPS, Galileo, Glonass, or Beidou (Compass) satellite systems. In other embodiments, SPS satellites may be from any one several regional navigation satellite systems (RNSS') such as, for example, Wide Area Augmentation System (WAAS), European Geostationary Navigation Overlay Service (EGNOS), Quasi-Zenith Satellite System (QZSS), just to name a few examples.

In addition, mobile device 100 may transmit radio signals to, and receive radio signals from, a wireless communication network. In one example, mobile device 100 may communicate with a cellular communication network by transmitting wireless signals to, or receiving wireless signals from, base station transceiver 110 over wireless communication link 123. Similarly, mobile device 100 may transmit wireless signals to, or receive wireless signals from local transceiver 115 over wireless communication link 125.

In a particular implementation, local transceiver 115 may be configured to communicate with mobile device 100 at a shorter range over wireless communication link 125 than at a range enabled by base station transceiver 110 over wireless communication link 123. For example, local transceiver 115 may be positioned in an indoor environment. Local transceiver 115 may provide access to a wireless local area network (WLAN, e.g., IEEE Std. 802.11 network) or wireless personal area network (WPAN, e.g., Bluetooth network). In another example implementation, local transceiver 115 may comprise a femto cell transceiver capable of facilitating communication on wireless communication link 125 according to a cellular communication protocol. Of course it should be understood that these are merely examples of networks that may communicate with a mobile device over a wireless link, and claimed subject matter is not limited in this respect.

In a particular implementation, base station transceiver 110 and local transceiver 115 may communicate with servers 140, 150 and/or 155 over a network 130 through links 145. Here, network 130 may comprise any combination of wired or wireless links. In a particular implementation, network 130 may comprise Internet Protocol (IP) infrastructure capable of facilitating communication between mobile device 100 and servers 140, 150 or 155 through local transceiver 115 or base station transceiver 110. In another implementation, network 130 may comprise cellular communication network infrastructure such as, for example, a base station controller or master switching center (not shown) to facilitate mobile cellular communication with mobile device 100.

In particular implementations, and as discussed below, mobile device 100 may have circuitry and processing resources capable of computing a position fix or estimated location of mobile device 100. For example, mobile device 100 may compute a position fix based, at least in part, on pseudorange measurements to four or more SPS satellites 160. Here, mobile device 100 may compute such pseudorange measurements based, at least in part, on pseudonoise code phase detections in signals 159 acquired from four or more SPS satellites 160. In particular implementations, mobile device 100 may receive from server 140, 150 or 155 positioning assistance data to aid in the acquisition of signals 159 transmitted by SPS satellites 160 including, for example, almanac, ephemeris data, Doppler search windows, just to name a few examples.

In other implementations, mobile device 100 may obtain a position fix by processing signals received from terrestrial transmitters fixed at known locations (e.g., such as base station transceiver 110) using any one of several techniques such as, for example, advanced forward trilateration (AFLT) and/or observed time difference of arrival (OTDOA). In these particular techniques, a range from mobile device 100 may be measured to three or more of such terrestrial transmitters fixed at known locations based, at least in part, on pilot signals transmitted by the transmitters fixed at known locations and received at mobile device 100. Here, servers 140, 150 or 155 may be capable of providing positioning assistance data to mobile device 100 including, for example, locations and identities of terrestrial transmitters to facilitate positioning techniques such as AFLT and OTDOA. For example, servers 140, 150 or 155 may include a base station almanac (BSA) which indicates locations and identities of cellular base stations in a particular region or regions.

In particular environments such as indoor environments or urban canyons, mobile device 100 may not be capable of acquiring signals 159 from a sufficient number of SPS satellites 160 or perform AFLT or OTDOA to compute a position fix. Alternatively, mobile device 100 may be capable of computing a position fix based, at least in part, on signals acquired from local transmitters (e.g., WLAN access points positioned at known locations). For example, mobile devices may obtain a position fix by measuring ranges to three or more indoor terrestrial wireless access points which are positioned at known locations. Such ranges may be measured, for example, by obtaining a MAC ID address from signals received from such access points and obtaining range measurements to the access points by measuring one or more characteristics of signals received from such access points such as, for example, received signal strength (RSSI) or round trip time (RTT). In alternative implementations, mobile device 100 may obtain an indoor position fix by applying characteristics of acquired signals to a radio heatmap indicating expected RSSI and/or RTT signatures at particular locations in an indoor area. In particular implementations, a radio heatmap may associate identities of local transmitters (e.g., a MAC address which is discernible from a signal acquired from a local transmitter), expected RSSI from signals transmitted by the identified local transmitters, an expected RTT from the identified transmitters, and possibly standard deviations from these expected RSSI or RTT. It should be understood, however, that these are merely examples of values that may be stored in a radio heatmap, and that claimed subject matter is not limited in this respect.

In particular implementations, mobile device 100 may receive positioning assistance data for indoor positioning operations from servers 140, 150 or 155. For example, such positioning assistance data may include locations and identities of transmitters positioned at known locations to enable measuring ranges to these transmitters based, at least in part, on a measured RSSI and/or RTT, for example. Other positioning assistance data to aid indoor positioning operations may include radio heatmaps, magnetic heatmaps, locations and identities of transmitters, routeability graphs, just to name a few examples. Other assistance data received by the mobile device may include, for example, local maps of indoor areas for display or to aid in navigation. Such a map may be provided to mobile device 100 as mobile device 100 enters a particular indoor area. Such a map may show indoor features such as doors, hallways, entry ways, walls, etc., points of interest such as bathrooms, pay phones, room names, stores, etc. By obtaining and displaying such a map, a mobile device may overlay a current location of the mobile device (and user) over the displayed map to provide the user with additional context.

In one implementation, a routeability graph and/or digital map may assist mobile device 100 in defining feasible areas for navigation within an indoor area and subject to physical obstructions (e.g., walls) and passageways (e.g., doorways in walls). Here, by defining feasible areas for navigation, mobile device 100 may apply constraints to aid in the application of filtering measurements for estimating locations and/or motion trajectories according to a motion model (e.g., according to a particle filter and/or Kalman filter). In addition to measurements obtained from the acquisition of signals from local transmitters, according to a particular embodiment, mobile device 100 may further apply a motion model to measurements or inferences obtained from inertial sensors (e.g., accelerometers, gyroscopes, magnetometers, etc.) and/or environment sensors (e.g., temperature sensors, microphones, barometric pressure sensors, ambient light sensors, camera imager, etc.) in estimating a location or motion state of mobile device 100.

According to an embodiment, mobile device 100 may access indoor navigation assistance data through servers 140, 150 or 155 by, for example, requesting the indoor assistance data through selection of a universal resource locator (URL). In particular implementations, servers 140, 150 or 155 may be capable of providing indoor navigation assistance data to cover many different indoor areas including, for example, floors of buildings, wings of hospitals, terminals at an airport, portions of a university campus, areas of a large shopping mall, just to name a few examples. Also, memory resources at mobile device 100 and data transmission resources may make receipt of indoor navigation assistance data for all areas served by servers 140, 150 or 155 impractical or infeasible, a request for indoor navigation assistance data from mobile device 100 may indicate a rough or course estimate of a location of mobile device 100. Mobile device 100 may then be provided indoor navigation assistance data covering areas including and/or proximate to the rough or course estimate of the location of mobile device 100.

In a particular implementation, particular messages flows between wireless STAs may be implemented for obtaining a measurement of RTT between the STAs for use in positioning operations as discussed above. In particular implementations, as described below, any STA may comprise a mobile device (e.g., mobile device 100) or a stationary transceiver (e.g., IEEE std. 802.11 access point, stationary Bluetooth device, local transceiver 115, etc.). As such, an exchange of messages between wireless STAs may comprise an exchange of messages between a mobile device and a stationary transceiver, between two peer mobile devices, or between two stationary transceivers, just to provide a few examples. In particular implementations, various techniques described herein may incorporate some, but not necessarily all, aspects or features of IEEE Standard 802.11 for Information technology—Telecommunications and information exchange between systems, Local and metropolitan area networks—Specific requirements Part 11: Wireless LAN Medium Access Control (MAC) and Physical Layer (PHY), Feb. 6, 2012, section 10.23.5 (hereinafter "IEEE std. 802.11"). Indeed, it should be understood that some features described herein are not shown, described or taught in the IEEE std. 802.11.

Figure 2:
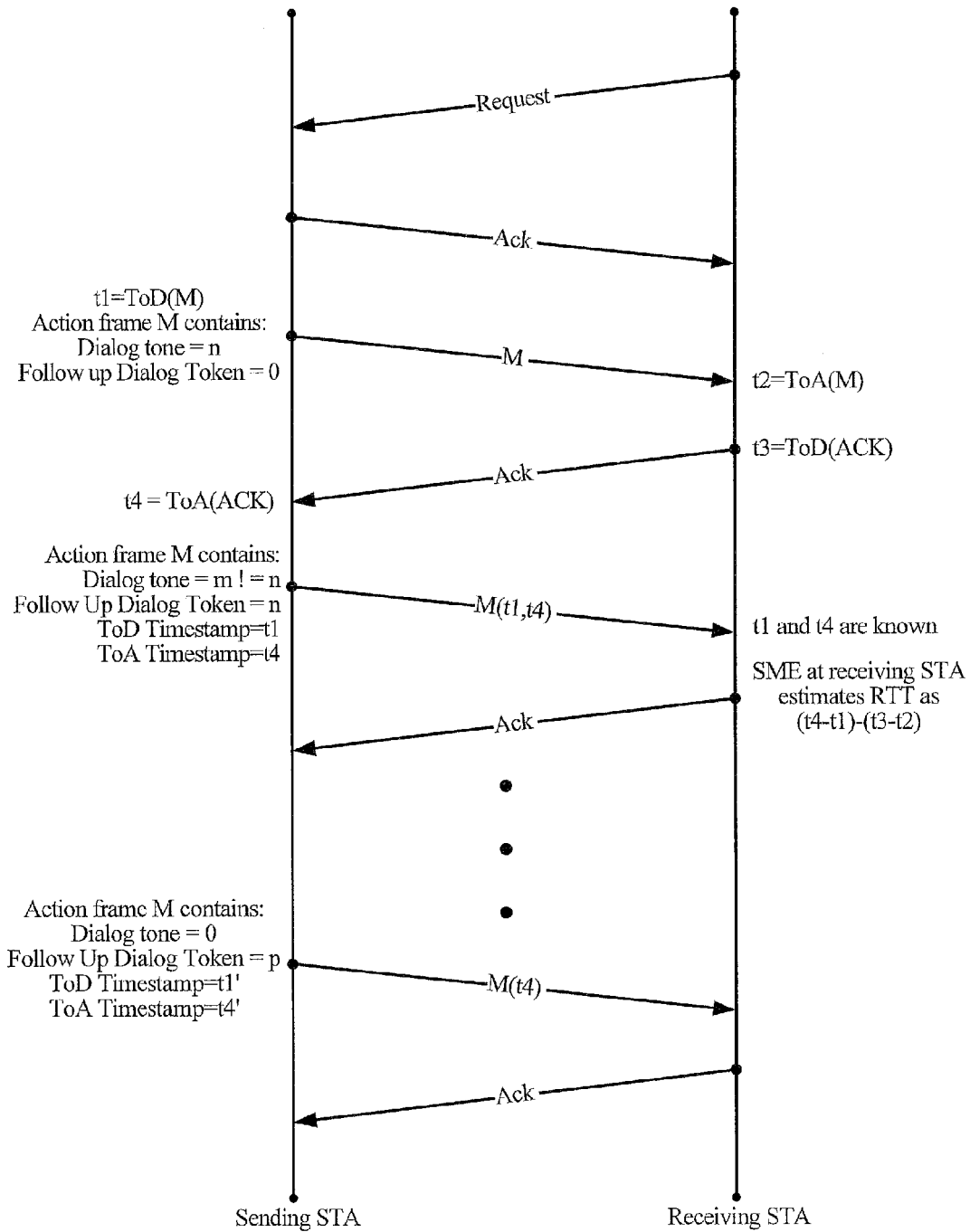
FIG. 2 a diagram illustrating a message flow between wireless stations (STAs) according to an embodiment.

FIG. 2 is a diagram illustrating a message flow between wireless stations STAs including a "sending" STA and a "receiving" STA according to an embodiment. In this context, a sending STA or receiving STA may comprise any one of several transceiver devices including a mobile device (e.g., mobile device 100) or stationary access transceiver device (e.g., local transceiver 115). A receiving STA may obtain or compute one or more measurements of RTT based, at least in part, on timing of messages or frames transmitted between the receiving STA and a sending STA. The receiving STA may transmit a fine timing measurement request message or frame ("Request") to the sending STA and receive an acknowledgement message or frame ("Ack") transmitted in response. In a particular implementation, while not limiting claimed subject matter in this respect, contents of such a fine timing measurement request may be as shown in the IEEE std. 802.11 at section 8.5.14.27. In particular implementations, such an Ack frame may merely provide an indication of receipt of a previously transmitted message. The receiving STA may then obtain or compute an RTT measurement based, at least in part, on time stamp values (t1, t4) provided in fine timing measurement messages or frames ("M") received from the sending STA. In a particular implementation, while not limiting claimed subject matter in this respect, contents of such a fine timing measurement message or frame may be as shown in the IEEE std. 802.11 at section 8.5.15.3. In one example implementation, a receiving STA may compute an RTT measurement as (t4−t1)−(t3 −t2), where t2 and t3 are the time of receipt of a previous fine timing measurement message or frame and transmission of preceding acknowledgement message or frame, respectively. The receiving STA may transmit a series of fine timing measurement request messages in a burst to obtain a corresponding number of RTT measurements which may be combined for removal of measurement noise in computing a range between the receiving and sending STAs.

Figure 3:
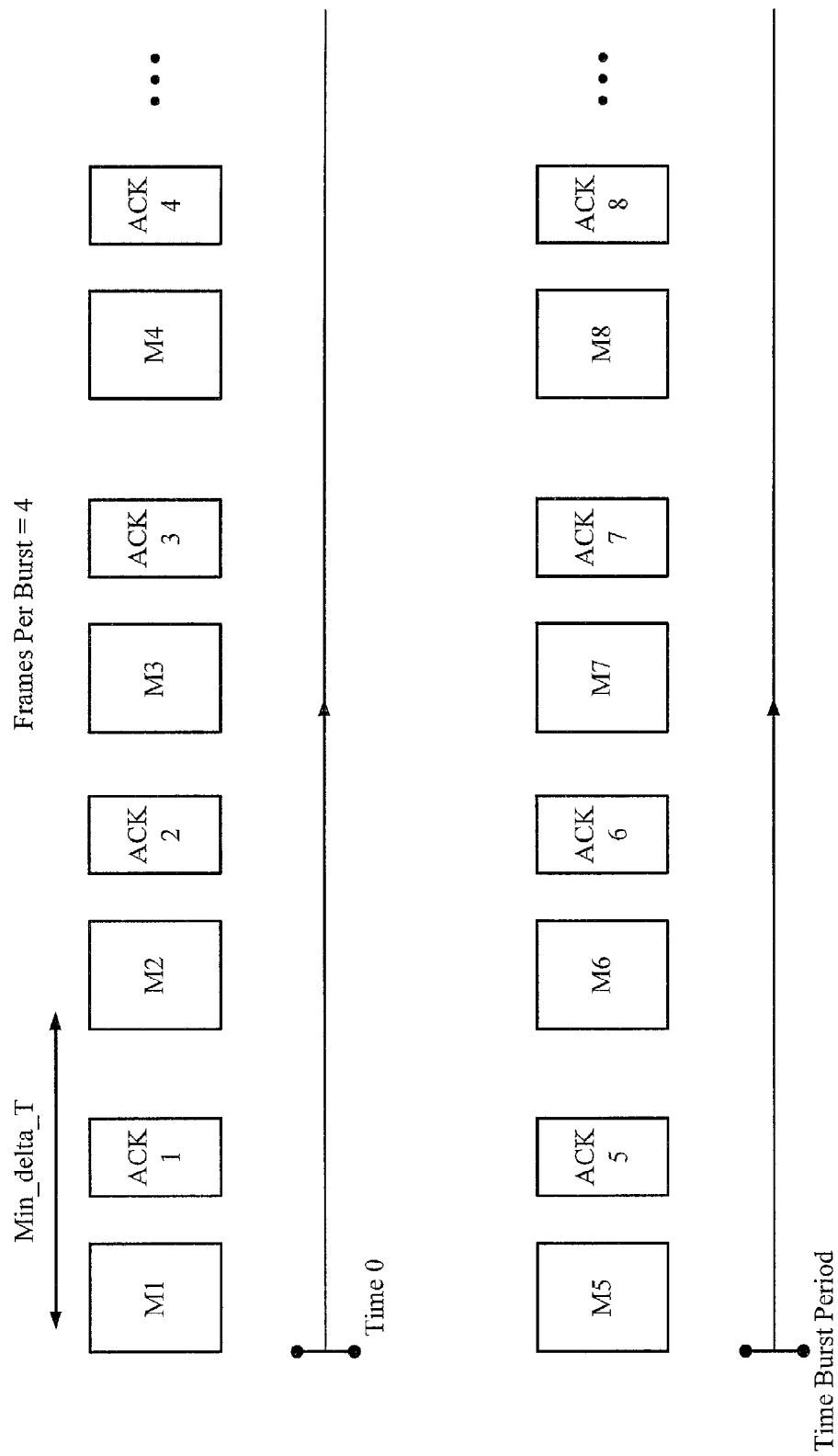
FIG. 3 is a diagram illustrating at least one aspect of timing in connection with message bursts in a message flow between wireless STAs according to an embodiment.

FIG. 3 is a diagram illustrating at least one aspect of timing in connection with message bursts in a message flow between wireless STAs according to an embodiment. As shown, multiple frame pairs of a fine timing measurement request message or frame and corresponding acknowledgement message or frame may be transmitted in a burst. In one aspect, a parameter Min_delta_T may specify a minimum time between starts of consecutive frame pairs ("fine timing measurement frame pairs") where a start of a frame pair may be marked by transmission of corresponding fine timing measurement request message of the pair. In another aspect, a number of frame pairs per burst may be defined. FIG. 4 shows fields of an example fine timing request message transmitted by a receiving STA according to an embodiment. In addition to fields Category, Action and Trigger as set forth in IEEE std.

802.11, fields Min_delta_T, Timeout, Frames per Burst and/or Burst Period may be defined. Here, a value of two for the Trigger field may indicate that the receiving STA may send an RTT measurement back to the sending STA. Here, the receiving STA may compute RTT based on techniques described above in connection with FIG. 2. The sending STA may now benefit from of the RTT measurement obtained and computed at the receiving STA. A value of four for the Trigger field may indicate that the receiving STA may accommodate Short Inter-Frame Space (SIFS) bursting techniques. A value for field Min_delta_T may indicate a minimum time (e.g., in units of µs) between fine timing measurement messages or frames as pointed out above. Field Timeout may indicate a length of time (e.g., in units of µs) from an initial fine timing request frame until the receiving STA receives a first fine timing measurement frame in response to the initial fine timing request frame. Field Frames Per Burst may indicate how many frame pairs are to be transmitted in a given burst. Field Burst Period may indicate how often a burst of measurements are to occur (e.g., in units of ms) where a small value may indicate an environment of frequent relative movement between sending and receiving STAs while a large value may indicate a relatively stationary environment.

FIG. 5 is a diagram showing fields in a fine timing measurement acknowledgement frame to be transmitted in response to a fine timing measurement request message or frame such as an implementation of a fine timing measurement request message or frame shown in FIG. 4 according to an embodiment. In a particular example implementation, values for the field Trigger in the timing measurement acknowledgement frame of FIG. 5 may indicate an acceptance, rejection or modification of a request set forth in a Trigger field of a corresponding fine timing measurement request. Here, in a particular implementation, the field Trigger in the timing measurement acknowledgement frame of FIG. 5 may indicate the following:

0: Initial Reject
1: OK (default behavior)
3: OK+Send RTT
5: OK+SIFS Bursting
7: OK+Send RTT+SIFS Bursting
127: Not authorized because of multiple rejections from multiple attempts Similarly, values for the field Min_delta_T OK of the timing measurement acknowledgement frame of FIG. 5 may indicate an acceptance, rejection or modification of a parameter set forth in a Min_delta_T field of a corresponding fine timing measurement request message or frame. Here, in a particular implementation, the Min_delta_T OK field of a fine timing measurement acknowledgement frame may indicate the following:

1: Min_delta_T indicated in a request message is acceptable
0: invitation to select a larger Min_delta_T Values for field Frames Per Burst of the fine timing measurement acknowledgement frame of FIG. 4 may indicate a number of frames a sending STA is capable of sending in a given burst. Values for the field Burst_Period OK of the timing measurement acknowledgement frame of FIG. 4 may indicate an acceptance, rejection or modification of a parameter Burst Period set forth in a corresponding fine timing measurement request frame. Values for Burst_Period OK may indicate the following:

1: Burst_Period is acceptable
0: Invitation to select a larger Burst_Period

Figure 6A:
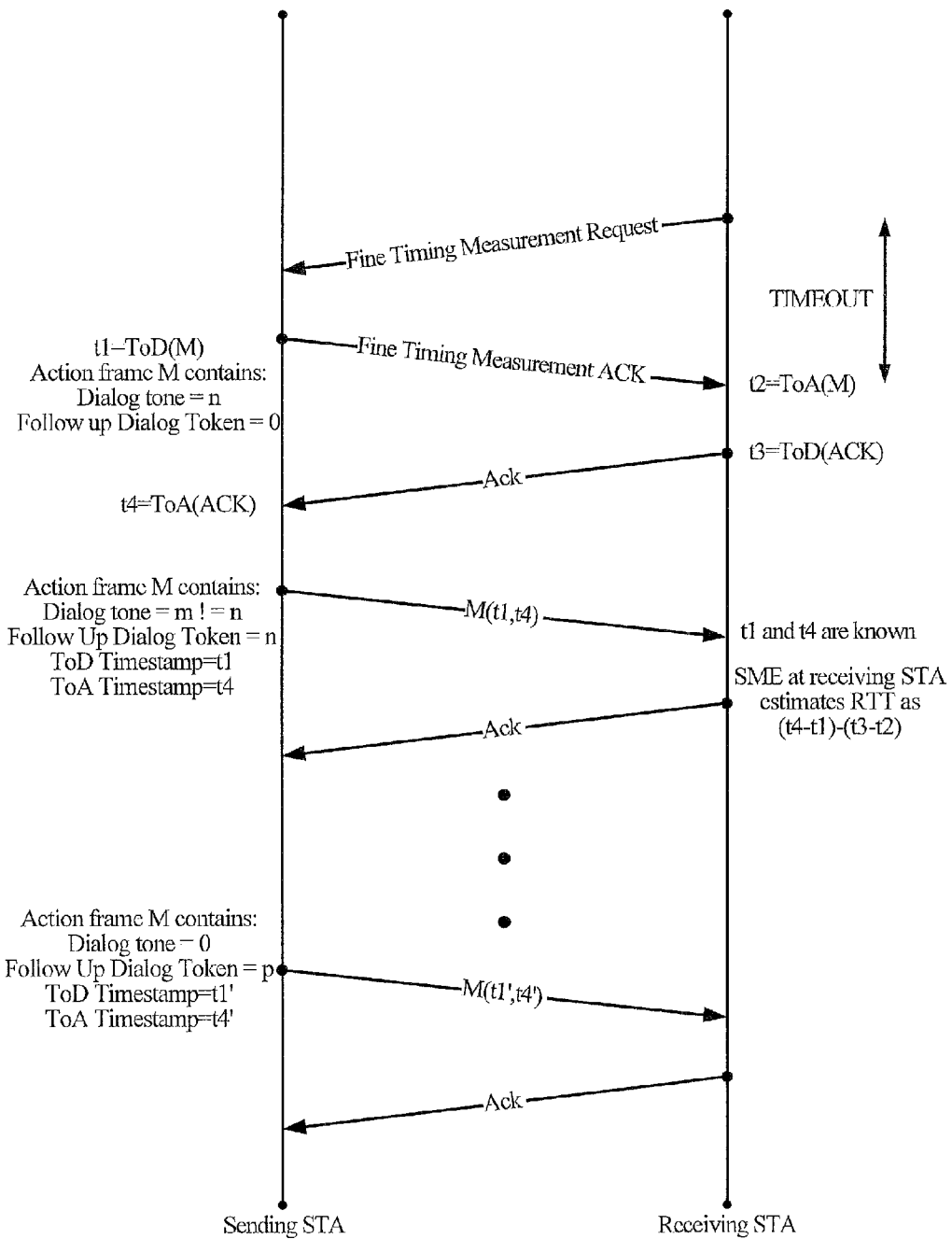
FIG. 6A a diagram illustrating a message flow between wireless STAs according to another alternative embodiment.

FIG. 6A is a diagram illustrating a message flow between wireless STAs according to another alternative embodiment in which a receiving STA transmits a fine timing measurement request message incorporating one or more aspects of the request messages of FIG. 3. A sending STA transmits a fine timing measurement acknowledgement message in response to the fine timing measurement request message incorporating one or more aspects of the acknowledgement message shown in FIG. 4. A value of field Timeout is shown as a maximum time between transmission of a the fine timing measurement request message at the receiving STA and receipt of a fine timing measurement acknowledgement messages at the receiving STA.

Figure 6B:
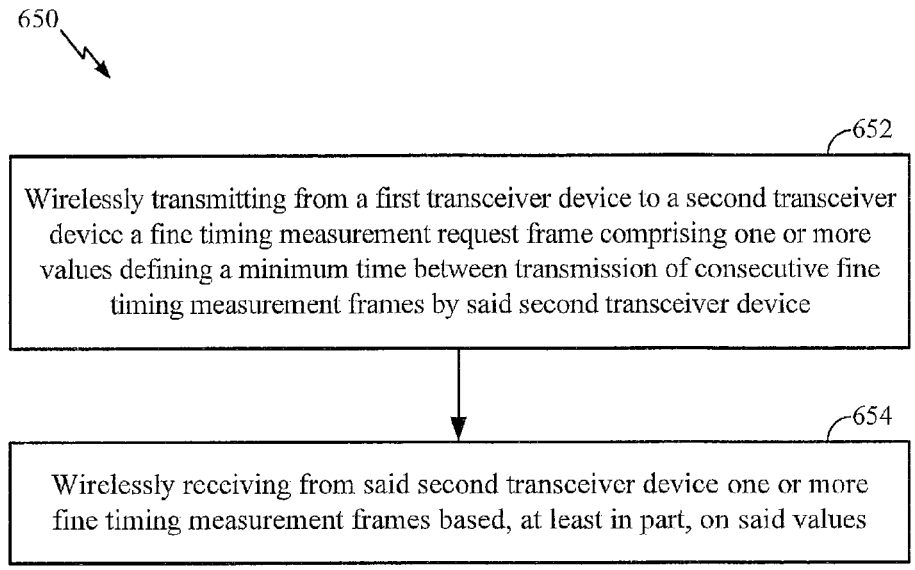
FIGS. 6B and 6C are flow diagrams of processes for exchanging fine timing measurement request frames and fine timing measurement acknowledgement frames by wireless STAs according to an embodiment.
Figure 6C:
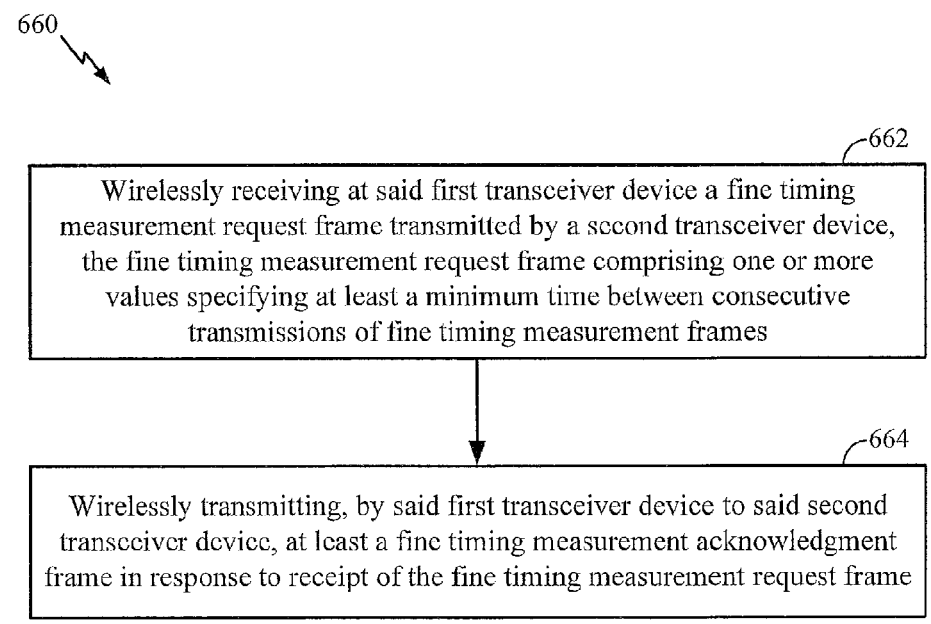

FIGS. 6B and 6C set out actions that may be taken by a receiving STA and a sending STA, respectively, according to an implementation of the message flow shown in FIG. 6A. At block 652, a receiving STA may wirelessly transmit a fine timing measurement request message or frame comprising one or more values defining a minimum time between consecutive fine timing measurement frames to be transmitted by the receiving STA in response. This may be specified, for example, by a value in field Min_delta_T as set forth in FIG. 4. In other implementations, the fine timing measurement request frame or message may specify one or more of values for Trigger, Timeout, Field Frames Per Burst, just to provide a few examples. In response to the fine timing measurement request message or frame transmitted at block 652, the receiving STA may wirelessly receive one or more fine timing measurement messages or frames from a sending STA at block 654. The receiving STA may then compute an RTT measurement based, at least in part, on the received fine timing measurement frames.

At block 662, a sending STA may receive a fine timing measurement request frame transmitted by a receiving STA at block 652 and, in response, wirelessly transmit a fine timing acknowledgement frame to the receiving STA at block 664. In one example, the fine timing acknowledgement frame transmitted at block 664 may comprise values for fields Min_delta_T, Trigger, Frames per Burst or Burst Period OK as described above in connection with FIG. 5.

Figure 7B:
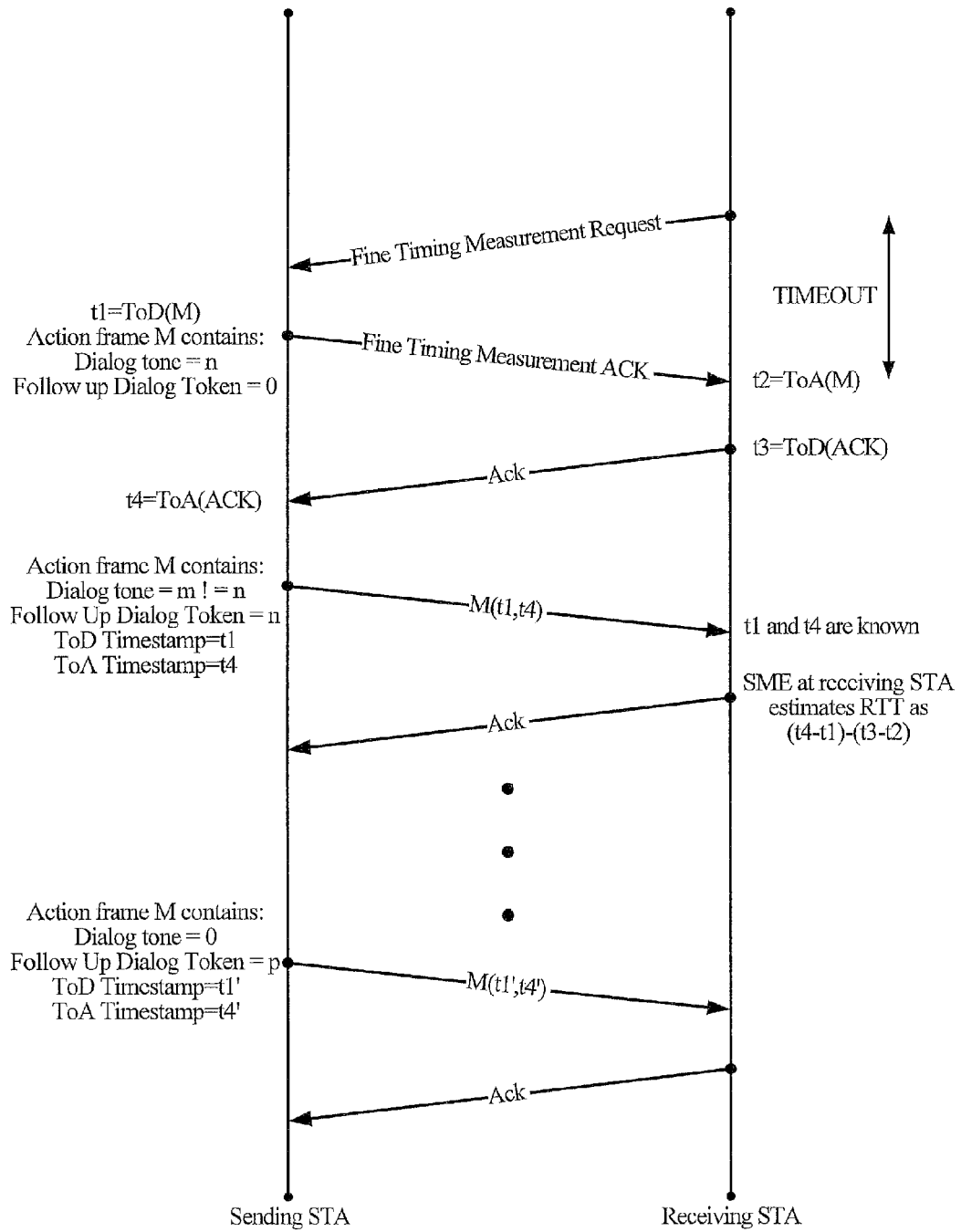
FIG. 7B is a diagram illustrating a message flow between wireless STAs according to another alternative embodiment.

FIG. 7A is a diagram showing fields in a hybrid fine timing measurement acknowledgement frame according to an embodiment including a time of arrival field TOA and a time of departure field TOD which may be transmitted in lieu of a fine timing measurement acknowledgement message (e.g., as shown in FIG. 5). Using values for fields TOA and or TOD received in a hybrid fine timing measurement acknowledgment frame, a receiving STA may compute RTT. Here, one or more aspects of a fine timing measurement acknowledgement message shown in FIG. 5 may be combined with a measurement message such that one fewer message may be transmitted from the sending STA to the receiving STA for obtaining an initial RTT measurement in a burst as illustrated in the message flow of FIG. 7B.

Figure 8:
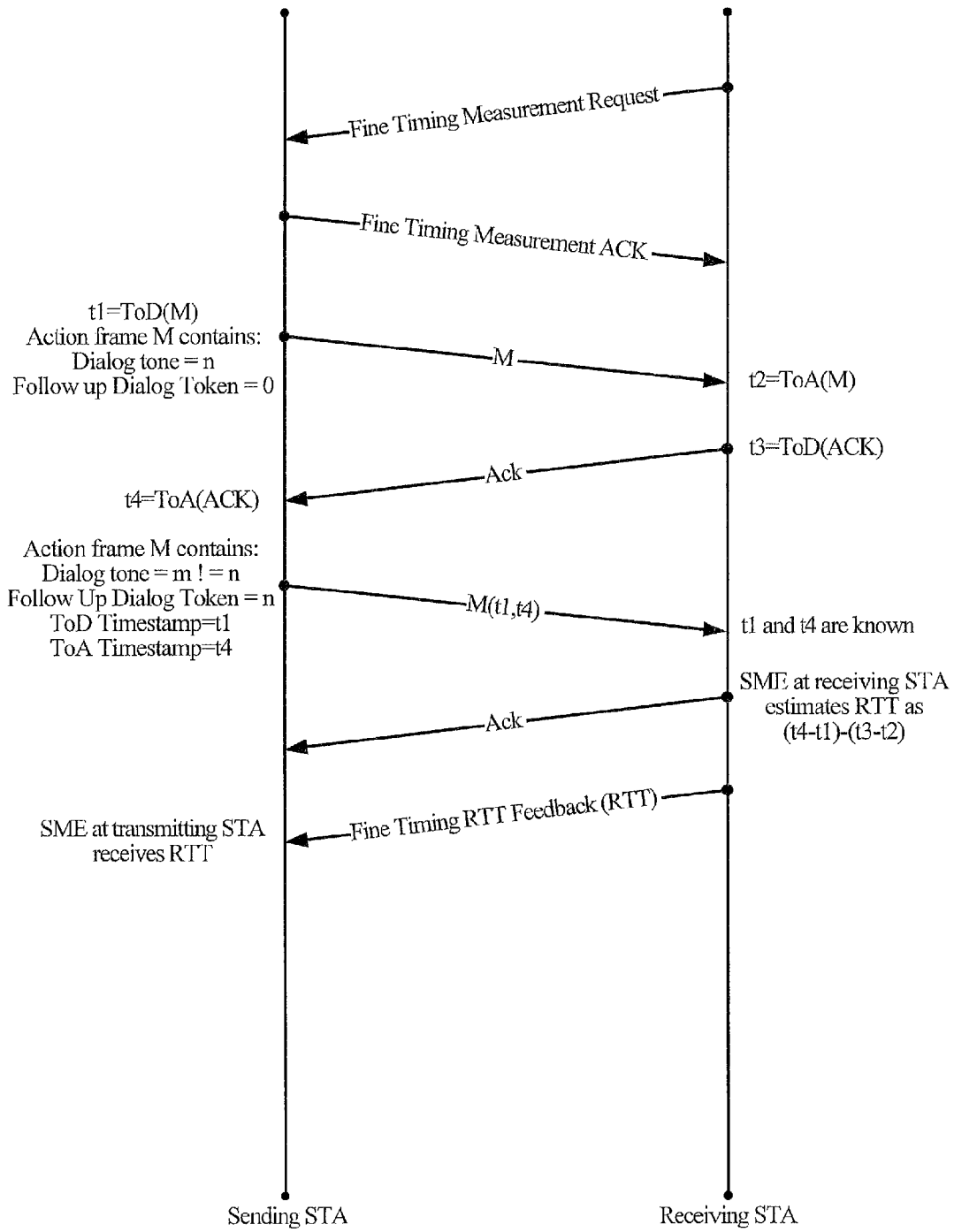
FIG. 8 a diagram illustrating a message flow between wireless STAs according to another alternative embodiment.
Figure 9A:
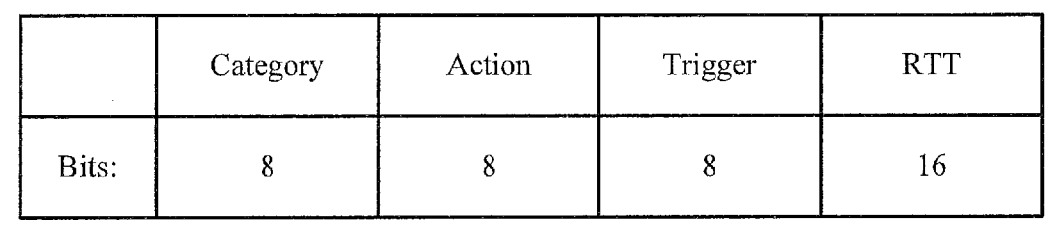

FIG. 8 is a diagram illustrating a message flow in which a receiving STA may provide or feedback an RTT measurement to a sending STA. An example of fields of a fine timing RTT feedback message is shown in FIG. 9A. As pointed out above, a receiving STA may compute an RTT measurement based, at least in part, on based, at least in part, on time stamp values (t1, t4) provided in fine timing measurement messages or frames received from the sending STA. Here, a computed RTT measurement in a fine timing RTT feedback message received at a sending STA may be used by the sending STA for computing or determining a range between the receiving and sending STAs.

Figure 9B:
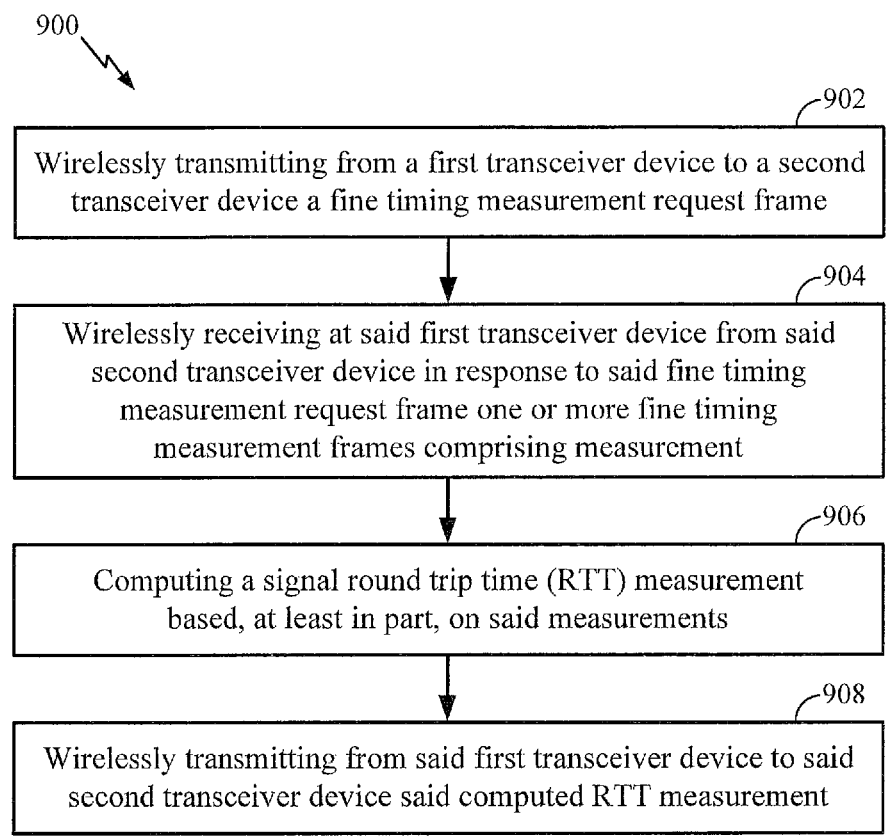
FIGS. 9B and 9C are flow diagrams of processes for exchanging an RTT measurement according to an embodiment.
Figure 9C:
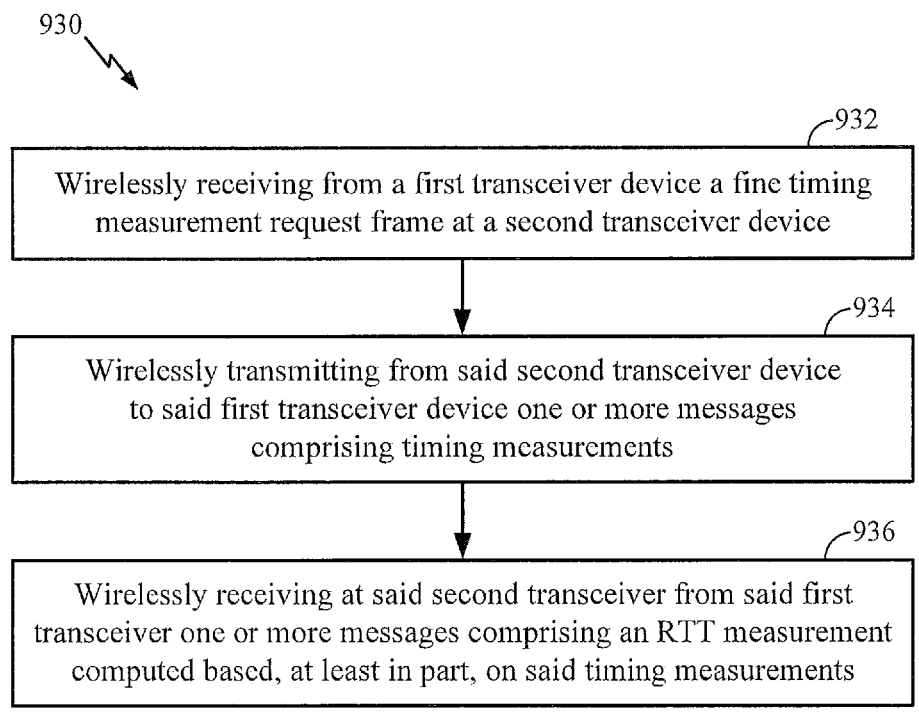

FIGS. 9B and 9C set out actions that may be taken by a receiving STA and a sending STA, respectively, according to an implementation of the message flow shown in FIG. 8. At block 902, a receiving STA may wirelessly transmit a fine timing measurement request message or frame to a sending STA. A sending STA may receive the transmitted fine timing measurement request message or frame at block 932 and wirelessly transmit to the receiving STA one or more timing measurements (e.g., t1 and t4) at block 934 in response to receipt of the fine timing measurement request frame at block 932. Messages comprising timing measurements transmitted at block 934 may be received at a receiving STA at block 904. The receiving STA may then compute a signal RTT measurement based, at least in part, on timing measurements received at block 904 using techniques discussed above. The receiving STA may then wirelessly transmit the RTT measurement computed at block 906 to the sending STA at block 908 (e.g., in a fine timing RTT feedback message as shown in FIG. 9A) for use by the sending STA in positioning operations, for example.

Figure 10:
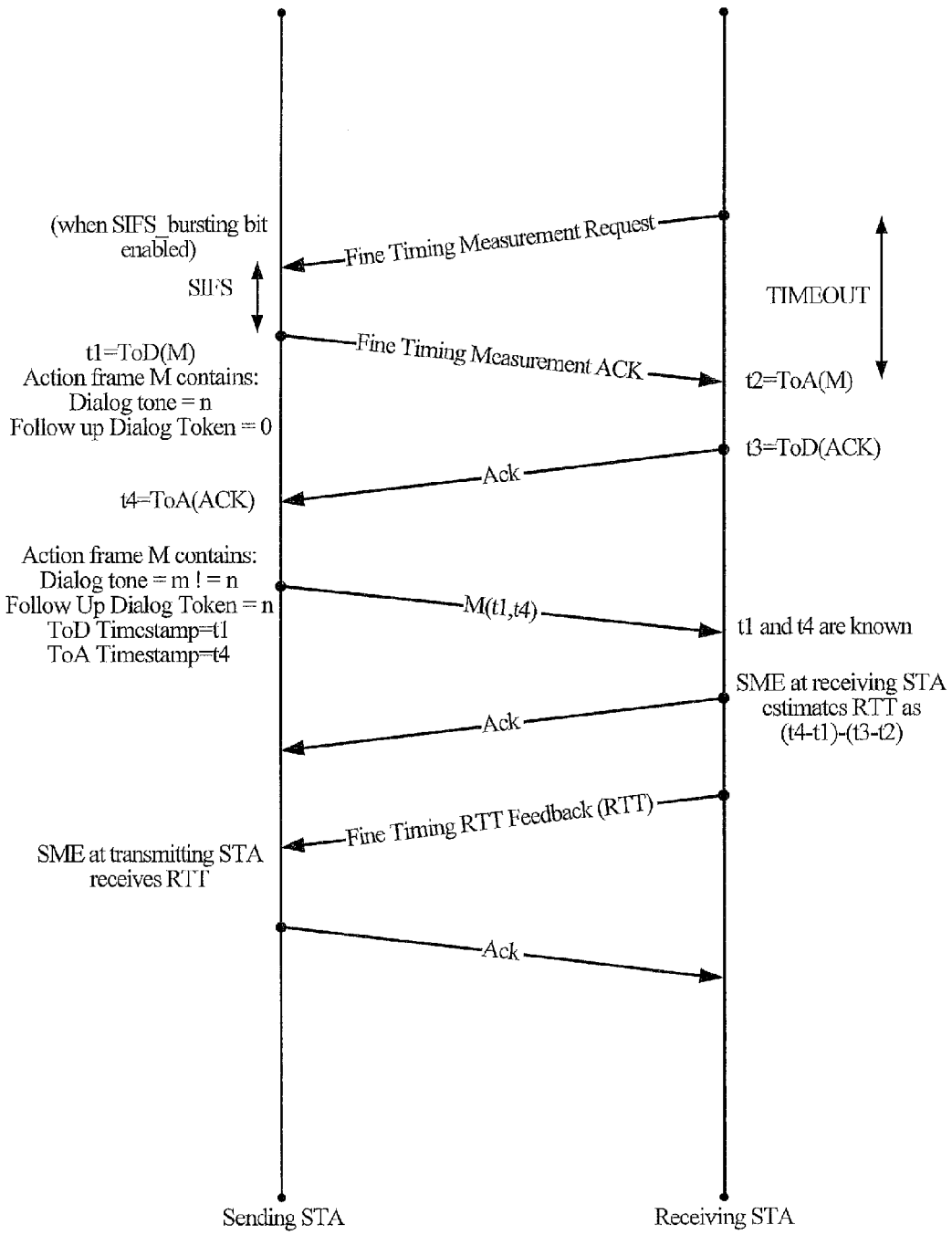
FIG. 10 a diagram illustrating a message flow between wireless STAs according to another alternative embodiment.

In an alternative implementation, a receiving STA at block 902 may transmit a fine timing measurement request frame specifying other parameters as provided in fields shown in FIG. 4. For example, a timeout period may be specified in a Timeout field and a Trigger field may specify SIFS to set out a fixed delay at the sending STA in transmitting a fine timing measurement acknowledgment frame on receipt of a fine timing measurement request frame or on receipt of an acknowledgment frame from the receiving STA in the course of a burst. FIG. 10 is a diagram illustrating an example message flow that also includes a fine timing RTT feedback message providing a sending STA with a computed RTT measurement (e.g., as transmitted at block 908

Figure 11:
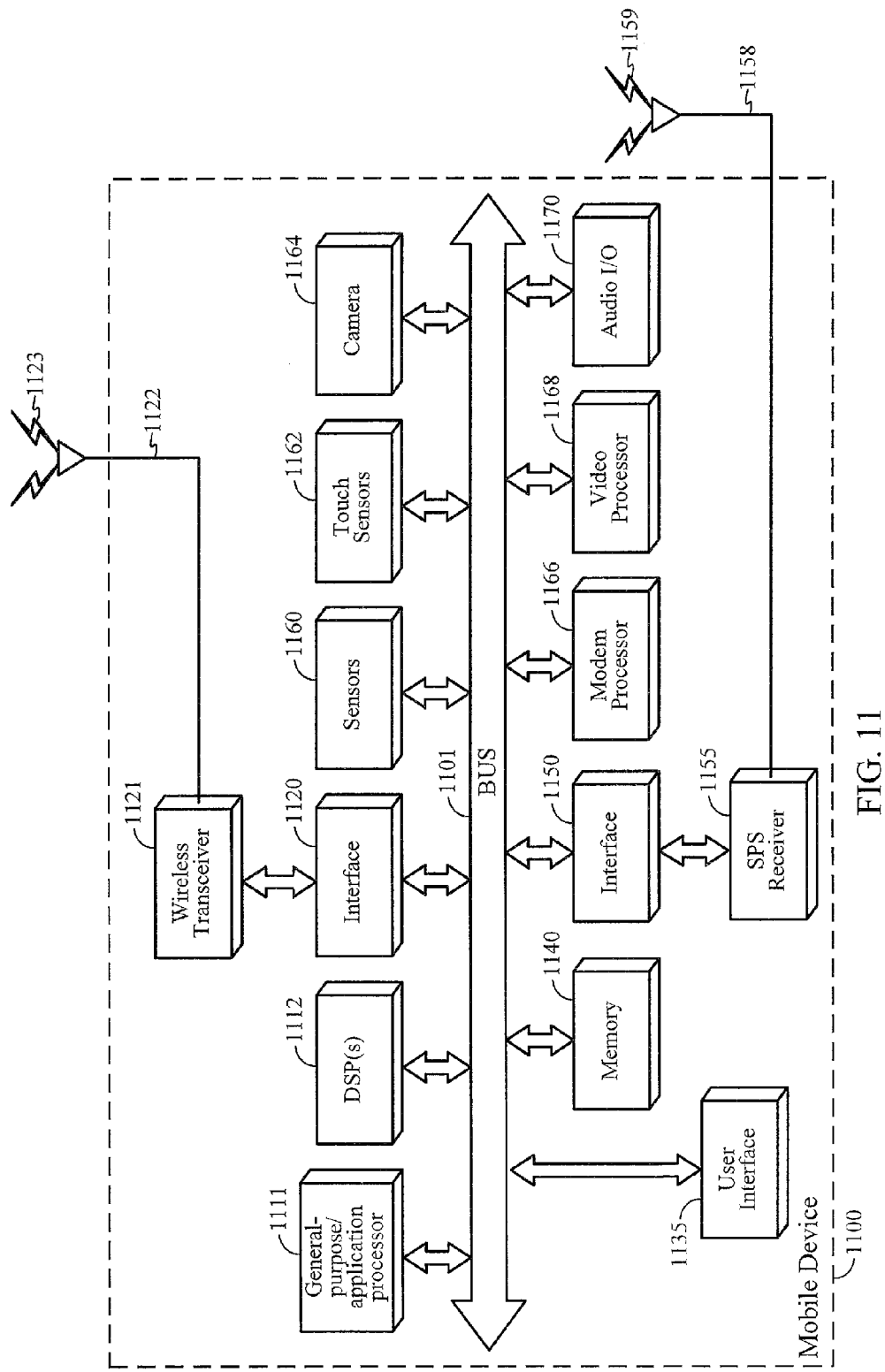
FIG. 11 is a schematic block diagram illustrating an exemplary device, in accordance with an implementation.

FIG. 11 is a schematic diagram of a mobile device according to an embodiment. Mobile device 100 (FIG. 1) may comprise one or more features of mobile device 1100 shown in FIG. 11. In certain embodiments, mobile device 1100 may also comprise a wireless transceiver 1121 which is capable of transmitting and receiving wireless signals 1123 via wireless antenna 1122 over a wireless communication network. Wireless transceiver 1121 may be connected to bus 1101 by a wireless transceiver bus interface 1120. Wireless transceiver bus interface 1120 may, in some embodiments be at least partially integrated with wireless transceiver 1121. Some embodiments may include multiple wireless transceivers 1121 and wireless antennas 1122 to enable transmitting and/or receiving signals according to a corresponding multiple wireless communication standards such as, for example, versions of IEEE Std. 802.11, CDMA, W-CDMA, LTE, UMTS, GSM, AMPS, Zigbee and Bluetooth, just to name a few examples.

Mobile device 1100 may also comprise SPS receiver 1155 capable of receiving and acquiring SPS signals 1159 via SPS antenna 1158. SPS receiver 1155 may also process, in whole or in part, acquired SPS signals 1159 for estimating a location of mobile device 1000. In some embodiments, general-purpose processor(s) 1111, memory 1140, DSP(s) 1112 and/or specialized processors (not shown) may also be utilized to process acquired SPS signals, in whole or in part, and/or calculate an estimated location of mobile device 1100, in conjunction with SPS receiver 1155. Storage of SPS or other signals for use in performing positioning operations may be performed in memory 1140 or registers (not shown).

Also shown in FIG. 11, mobile device 1100 may comprise digital signal processor(s) (DSP(s)) 1112 connected to the bus 1101 by a bus interface 1110, general-purpose processor(s) 1111 connected to the bus 1101 by a bus interface 1110 and memory 1140. Bus interface 1110 may be integrated with the DSP(s) 1112, general-purpose processor(s) 1111 and memory 1140. In various embodiments, functions may be performed in response execution of one or more machine-readable instructions stored in memory 1140 such as on a computer-readable storage medium, such as RAM, ROM, FLASH, or disc drive, just to name a few example. The one or more instructions may be executable by general-purpose processor(s) 1111, specialized processors, or DSP(s) 1112. Memory 1140 may comprise a non-transitory processor-readable memory and/or a computer-readable memory that stores software code (programming code, instructions, etc.) that are executable by processor(s) 1111 and/or DSP(s) 1112 to perform functions described herein. In a particular implementation, wireless transceiver 1121 may communicate with general-purpose processor(s) 1111 and/or DSP(s) 1112 through bus 1101 to enable mobile device 1100 to be configured as a wireless STA as discussed above. General-purpose processor(s) 1111 and/or DSP(s) 1112 may execute instructions to execute one or more aspects of processes discussed above in connection with FIGS. 6B, 6C, 9B and 9C.

Also shown in FIG. 11, a user interface 1135 may comprise any one of several devices such as, for example, a speaker, microphone, display device, vibration device, keyboard, touch screen, just to name a few examples. In a particular implementation, user interface 1135 may enable a user to interact with one or more applications hosted on mobile device 1100. For example, devices of user interface 1135 may store analog or digital signals on memory 1140 to be further processed by DSP(s) 1112 or general purpose/application processor 1111 in response to action from a user. Similarly, applications hosted on mobile device 1100 may store analog or digital signals on memory 1140 to present an output signal to a user. In another implementation, mobile device 1100 may optionally include a dedicated audio input/output (I/O) device 1170 comprising, for example, a dedicated speaker, microphone, digital to analog circuitry, analog to digital circuitry, amplifiers and/or gain control. It should be understood, however, that this is merely an example of how an audio I/O may be implemented in a mobile device, and that claimed subject matter is not limited in this respect. In another implementation, mobile device 1100 may comprise touch sensors 1162 responsive to touching or pressure on a keyboard or touch screen device.

Mobile device 1100 may also comprise a dedicated camera device 1164 for capturing still or moving imagery. Dedicated camera device 1164 may comprise, for example an imaging sensor (e.g., charge coupled device or CMOS imager), lens, analog to digital circuitry, frame buffers, just to name a few examples. In one implementation, additional processing, conditioning, encoding or compression of signals representing captured images may be performed at general purpose/application processor 1111 or DSP(s) 1112. Alternatively, a dedicated video processor 1168 may perform conditioning, encoding, compression or manipulation of signals representing captured images. Additionally, dedicated video processor 1168 may decode/decompress stored image data for presentation on a display device (not shown) on mobile device 1100.

Mobile device 1100 may also comprise sensors 1160 coupled to bus 1101 which may include, for example, inertial sensors and environment sensors. Inertial sensors of sensors 1160 may comprise, for example accelerometers (e.g., collectively responding to acceleration of mobile device 1100 in three dimensions), one or more gyroscopes or one or more magnetometers (e.g., to support one or more compass applications). Environment sensors of mobile device 1100 may comprise, for example, temperature sensors, barometric pressure sensors, ambient light sensors, camera imagers, microphones, just to name few examples. Sensors 1160 may generate analog or digital signals that may be stored in memory 1140 and processed by DPS(s) or general purpose/application processor 1111 in support of one or more applications such as, for example, applications directed to positioning or navigation operations.

In a particular implementation, mobile device 1100 may comprise a dedicated modem processor 1166 capable of performing baseband processing of signals received and downconverted at wireless transceiver 1121 or SPS receiver 1155. Similarly, dedicated modem processor 1166 may perform baseband processing of signals to be upconverted for transmission by wireless transceiver 1121. In alternative implementations, instead of having a dedicated modem processor, baseband processing may be performed by a general purpose processor or DSP (e.g., general purpose/application processor 1111 or DSP(s) 1112). It should be understood, however, that these are merely examples of structures that may perform baseband processing, and that claimed subject matter is not limited in this respect.

Figure 12:
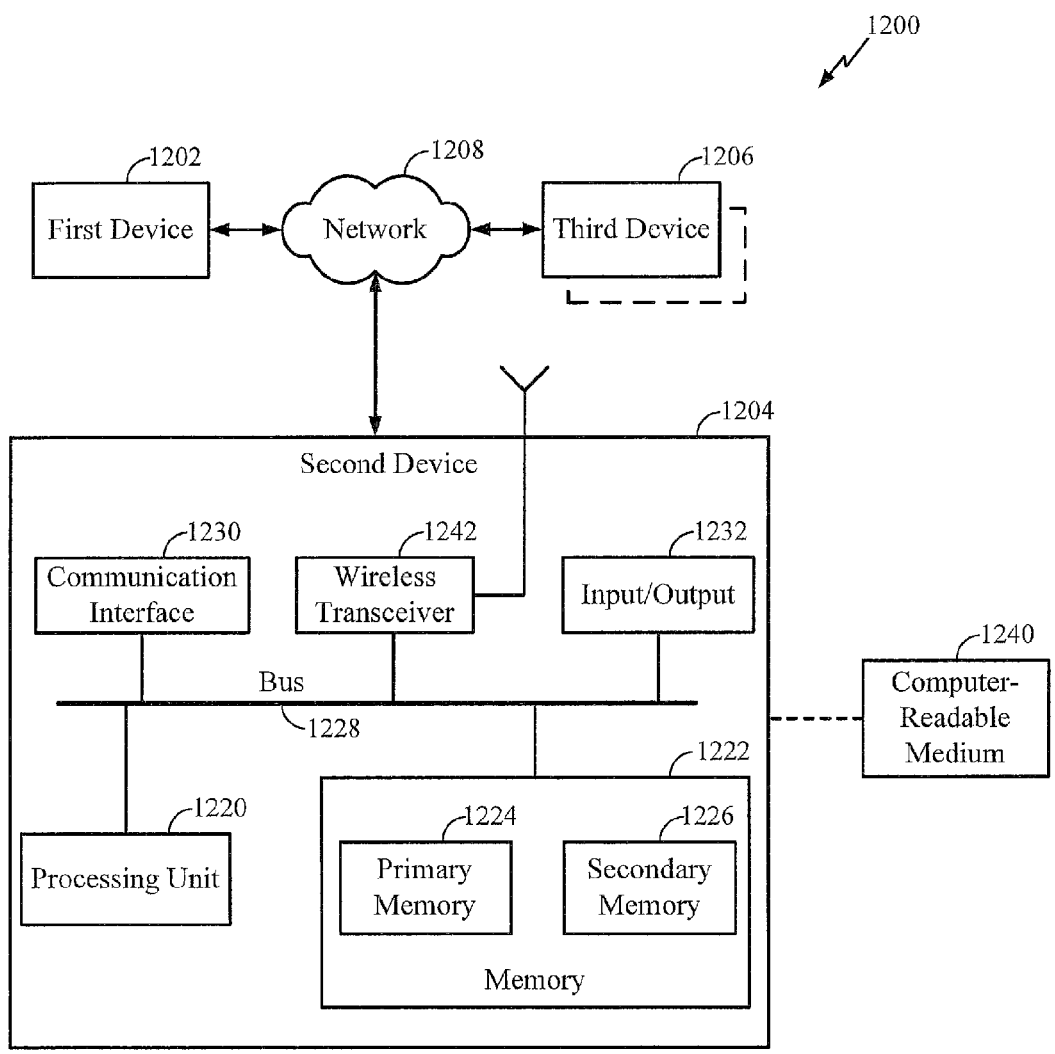
FIG. 12 is a schematic block diagram of an example computing platform in accordance with an implementation.

FIG. 12 is a schematic diagram illustrating an example system 1200 that may include one or more devices configurable to implement techniques or processes described above, for example, in connection with FIG. 1. System 1200 may include, for example, a first device 1202, a second device 1204, and a third device 1206, which may be operatively coupled together through a wireless communications network 1208. In an aspect, first device 1202 may comprise a server capable of providing positioning assistance data such as, for example, a base station almanac. Second and third devices 1204 and 1206 may comprise mobile devices, in an aspect. Also, in an aspect, wireless communications network 1208 may comprise one or more wireless access points, for example. However, claimed subject matter is not limited in scope in these respects.

First device 1202, second device 1204 and third device 1206, as shown in FIG. 12, may be representative of any device, appliance or machine (e.g., such as local transceiver 115 or servers 140, 150 or 155 as shown in FIG. 1) that may be configurable to exchange data over wireless communications network 1208. By way of example but not limitation, any of first device 1202, second device 1204, or third device 1206 may include: one or more computing devices or platforms, such as, e.g., a desktop computer, a laptop computer, a workstation, a server device, or the like; one or more personal computing or communication devices or appliances, such as, e.g., a personal digital assistant, mobile communication device, or the like; a computing system or associated service provider capability, such as, e.g., a database or data storage service provider/system, a network service provider/system, an Internet or intranet service provider/system, a portal or search engine service provider/system, a service access transceiver device capable of facilitating wireless service to a mobile device such as a WLAN access point or femto cell as part of a wireless communication service provider/system; or any combination thereof. Any of the first, second, and third devices 1202, 1204, and 1206, respectively, may comprise one or more of a base station almanac server, a base station, or a mobile device in accordance with the examples described herein.

Similarly, wireless communications network 1208 (e.g., in a particular of implementation of network 130 shown in FIG. 1), may be representative of one or more communication links, processes, or resources configurable to support the exchange of data between at least two of first device 1202, second device 1204, and third device 1206. By way of example but not limitation, communications network 1208 may include wireless or wired communication links, telephone or telecommunications systems, data buses or channels, optical fibers, terrestrial or space vehicle resources, local area networks, wide area networks, intranets, the Internet, routers or switches, and the like, or any combination thereof. As illustrated, for example, by the dashed lined box illustrated as being partially obscured of third device 1206, there may be additional like devices operatively coupled to wireless communications network 1208.

It is recognized that all or part of the various devices and networks shown in system 1200, and the processes and methods as further described herein, may be implemented using or otherwise including hardware, firmware, software, or any combination thereof.

Thus, by way of example but not limitation, second device 1204 may include at least one processing unit 1220 that is operatively coupled to a memory 1222 through a bus 1228.

Processing unit 1220 is representative of one or more circuits configurable to perform at least a portion of a data computing procedure or process. By way of example but not limitation, processing unit 1220 may include one or more processors, controllers, microprocessors, microcontrollers, application specific integrated circuits, digital signal processors, programmable logic devices, field programmable gate arrays, and the like, or any combination thereof. Wireless transceiver 1242 may communicate with processing unit 1220 through bus 1228 to enable second device 1204 to be configured as a wireless STA as discussed above. Processing unit 1220 may execute instructions to execute one or more aspects of processes discussed above in connection with FIGS. 6B, 6C, 9B and 9C.

Memory 1222 is representative of any data storage mechanism. Memory 1222 may include, for example, a primary memory 1224 or a secondary memory 1226. Primary memory 1224 may include, for example, a random access memory, read only memory, etc. While illustrated in this example as being separate from processing unit 1220, it should be understood that all or part of primary memory 1224 may be provided within or otherwise co-located/coupled with processing unit 1220.

Secondary memory 1226 may include, for example, the same or similar type of memory as primary memory or one or more data storage devices or systems, such as, for example, a disk drive, an optical disc drive, a tape drive, a solid state memory drive, etc. In certain implementations, secondary memory 1226 may be operatively receptive of, or otherwise configurable to couple to, a computer-readable medium 1240. Computer-readable medium 1240 may include, for example, any non-transitory medium that can carry or make accessible data, code or instructions for one or more of the devices in system 1200. Computer-readable medium 1240 may also be referred to as a storage medium.

Second device 1204 may include, for example, a communication interface 1030 that provides for or otherwise supports the operative coupling of second device 1204 to at least wireless communications network 1208. By way of example but not limitation, communication interface 1230 may include a network interface device or card, a modem, a router, a switch, a transceiver, and the like.

Second device 1204 may include, for example, an input/output device 1232. Input/output device 1232 is representative of one or more devices or features that may be configurable to accept or otherwise introduce human or machine inputs, or one or more devices or features that may be configurable to deliver or otherwise provide for human or machine outputs. By way of example but not limitation, input/ output device 1232 may include an operatively configured display, speaker, keyboard, mouse, trackball, touch screen, data port, etc.

The methodologies described herein may be implemented by various means depending upon applications according to particular examples. For example, such methodologies may be implemented in hardware, firmware, software, or combinations thereof. In a hardware implementation, for example, a processing unit may be implemented within one or more application specific integrated circuits ("ASICs"), digital signal processors ("DSPs"), digital signal processing devices ("DSPDs"), programmable logic devices ("PLDs"), field programmable gate arrays ("FPGAs"), processors, controllers, micro-controllers, microprocessors, electronic devices, other devices units designed to perform the functions described herein, or combinations thereof.

Some portions of the detailed description included herein are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular operations pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer, special purpose computing apparatus or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Wireless communication techniques described herein may be in connection with various wireless communications networks such as a wireless wide area network ("WWAN"), a wireless local area network ("WLAN"), a wireless personal area network (WPAN), and so on. The term "network" and "system" may be used interchangeably herein. A WWAN may be a Code Division Multiple Access ("CDMA") network, a Time Division Multiple Access ("TDMA") network, a Frequency Division Multiple Access ("FDMA") network, an Orthogonal Frequency Division Multiple Access ("OFDMA") network, a Single-Carrier Frequency Division Multiple Access ("SC-FDMA") network, or any combination of the above networks, and so on. A CDMA network may implement one or more radio access technologies ("RATs") such as cdma2000, Wideband-CDMA ("W-CDMA"), to name just a few radio technologies. Here, cdma2000 may include technologies implemented according to IS-95, IS-2000, and IS-856 standards. A TDMA network may implement Global System for Mobile Communications ("GSM"), Digital Advanced Mobile Phone System ("D-AMPS"), or some other RAT. GSM and W-CDMA are described in documents from a consortium named "3rd Generation Partnership Project" ("3GPP"). Cdma2000 is described in documents from a consortium named "3rd Generation Partnership Project 2" ("3GPP2"). 3GPP and 3GPP2 documents are publicly available. 4G Long Term Evolution ("LTE") communications networks may also be implemented in accordance with claimed subject matter, in an aspect. A WLAN may comprise an IEEE 802.11x network, and a WPAN may comprise a Bluetooth network, an IEEE 802.15x, for example. Wireless communication implementations described herein may also be used in connection with any combination of WWAN, WLAN or WPAN.

In another aspect, as previously mentioned, a wireless transmitter or access point may comprise a femtocell, utilized to extend cellular telephone service into a business or home. In such an implementation, one or more mobile devices may communicate with a femtocell via a code division multiple access ("CDMA") cellular communication protocol, for example, and the femtocell may provide the mobile device access to a larger cellular telecommunication network by way of another broadband network such as the Internet.

Techniques described herein may be used with an SPS that includes any one of several GNSS and/or combinations of GNSS. Furthermore, such techniques may be used with positioning systems that utilize terrestrial transmitters acting as "pseudolites", or a combination of SVs and such terrestrial transmitters. Terrestrial transmitters may, for example, include ground-based transmitters that broadcast a PN code or other ranging code (e.g., similar to a GPS or CDMA cellular signal). Such a transmitter may be assigned a unique PN code so as to permit identification by a remote receiver. Terrestrial transmitters may be useful, for example, to augment an SPS in situations where SPS signals from an orbiting SV might be unavailable, such as in tunnels, mines, buildings, urban canyons or other enclosed areas. Another implementation of pseudolites is known as radio-beacons. The term "SV", as used herein, is intended to include terrestrial transmitters acting as pseudolites, equivalents of pseudolites, and possibly others. The terms "SPS signals" and/or "SV signals", as used herein, is intended to include SPS-like signals from terrestrial transmitters, including terrestrial transmitters acting as pseudolites or equivalents of pseudolites.

The terms, "and," and "or" as used herein may include a variety of meanings that will depend at least in part upon the context in which it is used. Typically, "or" if used to associate a list, such as A, B or C, is intended to mean A, B, and C, here used in the inclusive sense, as well as A, B or C, here used in the exclusive sense. Reference throughout this specification to "one example" or "an example" means that a particular feature, structure, or characteristic described in connection with the example is included in at least one example of claimed subject matter. Thus, the appearances of the phrase "in one example" or "an example" in various places throughout this specification are not necessarily all referring to the same example. Furthermore, the particular features, structures, or characteristics may be combined in one or more examples. Examples described herein may include machines, devices, engines, or apparatuses that operate using digital signals. Such signals may comprise electronic signals, optical signals, electromagnetic signals, or any form of energy that provides information between locations.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter may also include all aspects falling within the scope of the appended claims, and equivalents thereof.

What is claimed is:

1. A method comprising, at a first transceiver device:
wirelessly transmitting from said first transceiver device to a second transceiver device a fine timing measurement request frame comprising one or more values defining a minimum time between transmission of consecutive fine timing measurement frames by said second transceiver device; and
wirelessly receiving, from said second transceiver device, one or more fine timing measurement frames based, at least in part, on said one or more values.

2. The method of claim 1, and further comprising:
computing a signal round trip time based, at least in part, on time stamp values provided in the received one or more fine timing measurement frames.

3. The method of claim 1, wherein said one or more values further specify a duration of time from transmission of an initial fine timing measurement request frame until receipt of a first fine timing measurement frame transmitted in response to the initial fine timing measurement request frame.

4. The method of claim 1, wherein said one or more values further specify a number of fine timing measurement frames to be transmitted in a burst of fine timing measurement frames.

5. The method of claim 4, wherein said one or more values further specify a duration of time for which said burst of fine timing measurement frames are to be transmitted by the second transceiver device.

6. The method of claim 1, wherein said fine timing measurement request frame and said one or more fine timing measurement frames are transmitted according to one or more versions of IEEE std. 802.11.

7. The method of claim 1, and further comprising:
transmitting to said second transceiver device a hybrid message frame comprising at least a fine timing measurement acknowledgement and one or more measurements applicable to computation of a signal round trip time between said first transceiver device and said second transceiver device.

8. The method of claim 1, wherein the fine timing measurement request frame further comprises at least one field capable of specifying transmission of a round trip time (RTT) to the second transceiver device, the RTT being computed at the first transceiver device based, at least in part, on measurements provided in the one or more fine timing measurement frames.

9. The method of claim 1, wherein the fine timing measurement request frame further comprises at least one field capable of specifying a length of time permitted from transmission of an initial fine timing measurement request frame by the first transceiver device to receipt of an initial fine timing measurement frame transmitted in response to the initial fine timing measurement request frame.

10. The method of claim 1, wherein the fine timing measurement request frame further comprises at least one field capable of specifying application of short inter-frame space bursting.

11. The method of claim 1, wherein the fine timing measurement request frame further comprises at least one field capable of specifying a number of frame pairs to be transmitted between said first transceiver device and said second transceiver device in a burst.

12. The method of claim 1, wherein the fine timing measurement request frame further comprises at least one field capable of specifying how often a burst of measurements are to occur.

13. A first transceiver device comprising:
a transceiver to wirelessly transmit and receive frames; and
one or more processors to:
initiate wireless transmission from the first transceiver device to a second transceiver device a fine timing measurement request frame comprising one or more values defining a minimum time between transmission of consecutive fine timing measurement frames by said second transceiver device; and
obtain one or more fine timing measurement frames wirelessly received from said second transceiver device based, at least in part, on said one or more values.

14. The first transceiver device of claim 13, wherein said one or more values further specify a duration of time from transmission of an initial fine timing measurement request frame until receipt of a first fine timing measurement frame transmitted in response to the initial fine timing measurement request frame.

15. The first transceiver device of claim 13, wherein said fine timing measurement request frame and said one or more fine timing measurement frames are transmitted according to one or more versions of IEEE std. 802.11.

16. The first transceiver device of claim 13, wherein the fine timing measurement request frame further comprises at least one field capable of specifying transmission of a round trip time (RTT) to the second transceiver device, the RTT being computed at the first transceiver device based, at least in part, on measurements provided in the one or more fine timing measurement frames.

17. The first transceiver device of claim 13, wherein the fine timing measurement request frame further comprises at least one field capable of specifying application of short inter-frame space bursting.

18. The first transceiver device of claim 13, wherein the fine timing measurement request frame further comprises at least one field capable of specifying how often a burst of measurements are to occur.

19. An article comprising:
a non-transitory storage medium comprising machine-readable instructions stored thereon which are executable by a special purpose computing apparatus of a first transceiver device to:
initiate wireless transmission from said first transceiver device to a second transceiver device a fine timing measurement request frame comprising one or more values defining a minimum time between transmission of consecutive fine timing measurement frames by said second transceiver device; and
obtain one or more fine timing measurement frames based, at least in part, on said one or more values received from said second transceiver device.

20. The article of claim 19, wherein said instructions are further executable by said special purpose computing apparatus to:
compute a signal round trip time based, at least in part, on time stamp values provided in the received one or more fine timing measurement frames.

21. The article of claim 19, wherein said one or more values further specify a number of fine timing measurement frames to be transmitted in a burst of fine timing measurement frames.

22. The article of claim 21, wherein said one or more values further specify a duration of time for which said burst of fine timing measurement frames are to be transmitted by the second transceiver device.

23. The article of claim 19, wherein said instructions are further executable by said special purpose computing apparatus to:
initiate transmission to said second transceiver device a hybrid message frame comprising at least a fine timing measurement acknowledgement and one or more measurements applicable to computation of a signal round trip time between said first transceiver device and said second transceiver device.

24. The article of claim 19, wherein the fine timing measurement request frame further comprises at least one field capable of specifying a length of time permitted from transmission of an initial fine timing measurement request frame by the first transceiver device to receipt of an initial fine timing measurement frame transmitted in response to the initial fine timing measurement request frame.

25. The article of claim 19, wherein the fine timing measurement request frame further comprises at least one field capable of specifying a number of frame pairs to be transmitted between said first transceiver device and said second transceiver device in a burst.

26. A first transceiver device comprising:
means for wirelessly transmitting to a second transceiver device a fine timing measurement request frame comprising one or more values defining a minimum time between transmission of consecutive fine timing measurement frames by said second transceiver device; and
means for wirelessly receiving, from said second transceiver device, one or more fine timing measurement frames based, at least in part, on said one or more values.

27. A method comprising, at a first transceiver device:
wirelessly receiving at said first transceiver device a fine timing measurement request frame transmitted by a second transceiver device, the fine timing measurement request frame comprising one or more values specifying at least a minimum time between consecutive transmissions of fine timing measurement frames; and
wirelessly transmitting, by said first transceiver device to said second transceiver device, at least a fine timing measurement acknowledgment frame in response to receipt of the fine timing measurement request frame.

28. The method of claim 27, wherein the fine timing measurement acknowledgment frame further comprises a field capable of indicating an acceptance or rejection of the minimum time between consecutive transmissions.

29. The method of claim 27, wherein said one or more values further specify a number of fine timing measurement frames to be transmitted by said first transceiver device in a burst of fine timing measurement frames, and wherein the fine timing measurement acknowledgment frame further comprises an acceptance or rejection of the specified number of fine timing measurement frames to be transmitted by said first transceiver device in a burst of fining timing measurement frames.

30. The method of claim 29, wherein said one or more values further specify a duration of time for which said burst of fine timing measurement frames are to be transmitted by the first transceiver device, and wherein the fine timing measurement acknowledgment frame further comprises an acceptance or rejection of the duration of time for which said burst of fine timing measurement frames are to be transmitted by the first transceiver device.

31. A first wireless station comprising:
a transceiver to wirelessly transmit and receive frames; and
one or more processors to:
obtain a fine timing measurement request frame wirelessly received at said transceiver and transmitted by a second wireless station, the fine timing measurement request frame comprising one or more values specifying at least a minimum time between consecutive transmissions of fine timing measurement frames; and
initiate wirelessly transmission through said transceiver to said second wireless station of at least a fine timing measurement acknowledgment frame in response to receipt of the fine timing measurement request frame.

32. The first wireless station of claim 31, wherein the fine timing measurement acknowledgment frame further comprises a field capable of indicating an acceptance or rejection of the minimum time between consecutive transmissions.

33. The first wireless station of claim 31, wherein said one or more values further specify a number of fine timing measurement frames to be transmitted by said first wireless station in a burst of fine timing measurement frames, and wherein the fine timing measurement acknowledgment frame further comprises an acceptance or rejection of the specified number of fine timing measurement frames to be transmitted by said first wireless station in a burst of fining timing measurement frames.

34. The first wireless station of claim 33, wherein said one or more values further specify a duration of time for which said burst of fine timing measurement frames are to be transmitted by the first wireless station, and wherein the fine timing measurement acknowledgment frame further comprises an acceptance or rejection of the duration of time for which said burst of fine timing measurement frames are to be transmitted by the first wireless station.

35. An article comprising:
a non-transitory storage medium comprising machine readable instructions stored there which are executable by a special purpose computing apparatus of a first wireless station to:
obtain a fine timing measurement request frame wirelessly received at said first wireless station and transmitted by a second wireless station, the fine timing measurement request frame comprising one or more values specifying at least a minimum time between consecutive transmissions of fine timing measurement frames; and
initiate wirelessly transmission to said second wireless station of at least a fine timing measurement acknowledgment frame in response to receipt of the fine timing measurement request frame.

36. The article of claim 35, wherein the fine timing measurement acknowledgment frame further comprises a field capable of indicating an acceptance or rejection of the minimum time between consecutive transmissions.

37. The article of claim 35, wherein said one or more values further specify a number of fine timing measurement frames to be transmitted by said first wireless station in a burst of fining timing measurement frames, and wherein the fine timing measurement acknowledgment frame further comprises an acceptance or rejection of the specified number of fine timing measurement frames to be transmitted by said first wireless station in a burst of fine timing measurement frames.

38. The article of claim 37, wherein said one or more values further specify a duration of time for which said burst of fine timing measurement frames are to be transmitted by the first wireless station, and wherein the fine timing measurement acknowledgment frame further comprises an acceptance or rejection of the duration of time for which said burst of fine timing measurement frames are to be transmitted by the first wireless station.

39. An apparatus comprising, at a first transceiver device:
means for wirelessly receiving at said first transceiver device a fine timing measurement request frame transmitted by a second transceiver device, the fine timing measurement request frame comprising one or more values specifying at least a minimum time between consecutive transmissions of fine timing measurement frames; and
means for wirelessly transmitting, by said first transceiver device to said second transceiver device, at least a fine timing measurement acknowledgment frame in response to receipt of the fine timing measurement request frame.

40. A method comprising:
wirelessly transmitting from a first transceiver device to a second transceiver device a fine timing measurement request frame;
wirelessly receiving, at said first transceiver device from said second transceiver device in response to said fine timing measurement request frame, one or more fine timing measurement frames comprising measurements;
computing a signal round trip time (RTT) measurement based, at least in part, on said measurements; and
wirelessly transmitting from said first transceiver device to said second transceiver device said computed signal RTT measurement.

41. The method of claim 40, wherein said fine timing measurement request frame comprises one or more values to further specify a duration of time from transmission of an initial fine timing measurement request frame until receipt of a first fine timing measurement frame transmitted in response to the initial fine timing measurement request frame.

42. The method of claim 40, wherein the fine timing measurement request frame comprises one or more values specifying a fixed duration of time between receipt of an acknowledgement frame at the second transceiver device and transmission of a fine timing measurement frame from the second transceiver device to the first transceiver device in response to the acknowledgement frame.

43. A first wireless station comprising:
a transceiver to wirelessly receive and wirelessly transmit frames; and
one or more processors to:
initiate wireless transmission through said transceiver to a second wireless station a fine timing measurement request frame;
obtain one or more fine timing measurement frames comprising measurements wirelessly received at said first wireless station and transmitted from said second wireless station in response to said fine timing measurement request frame;
compute a signal round trip time (RTT) measurement based, at least in part, on said measurements; and
initiate wireless transmission through said transceiver to said second wireless station said computed signal RTT measurement.

44. The first wireless station of claim 43, wherein said fine timing measurement request frame comprises one or more values to specify a duration of time from transmission of an initial fine timing measurement request frame until receipt of a first fine timing measurement frame transmitted in response to the initial fine timing measurement request frame.

45. The first wireless station of claim 43, wherein the fine timing measurement request frame comprises one or more values specifying a fixed duration of time between receipt of an acknowledgement frame at the second wireless station and transmission of a fine timing measurement frame from the second wireless station to the first wireless station in response to the acknowledgement frame.

46. An article comprising:
a non-transitory storage medium comprising machine-readable instructions stored thereon which are executable by a special purpose computing apparatus of a first wireless station to:
initiate wireless transmission of a fine timing measurement request frame to a second wireless station;
obtain one or more fine timing measurement frames comprising measurements wirelessly received at said first wireless station and transmitted from said second wireless station in response to said fine timing measurement request frame;
compute a signal round trip time (RTT) measurement based, at least in part, on said measurements; and
initiate wireless transmission to said second wireless station said computed signal RTT measurement.

47. The article of claim 46, wherein said fine timing measurement request frame comprises one or more values to specify a duration of time from transmission of an initial fine timing measurement request frame until receipt of a first fine timing measurement frame transmitted in response to the initial fine timing measurement request frame.

48. The article of claim 46, wherein the fine timing measurement request frame comprises one or more values specifying a fixed duration of time between receipt of a an acknowledgement frame at the second wireless station and transmission of a fine timing measurement frame from the second wireless station to the first wireless station in response to the acknowledgement frame.

49. A first transceiver device comprising:
means for wirelessly transmitting from said first transceiver device to a second transceiver device a fine timing measurement request frame;
means for wirelessly receiving, from said second transceiver device in response to said fine timing measurement request frame, one or more fine timing measurement frames comprising measurements;
means for computing a signal round trip time (RTT) measurement based, at least in part, on said measurements; and
means for wirelessly transmitting from said first transceiver device to said second transceiver device said computed signal RTT measurement.

50. A method comprising:
wirelessly receiving from a first transceiver device a fine timing measurement request frame at a second transceiver device;

wirelessly transmitting, from said second transceiver device to said first transceiver device, one or more messages comprising timing measurements; and wirelessly receiving, at said second transceiver device from said first transceiver device, one or more messages comprising a round trip time (RTT) measurement computed based, at least in part, on said timing measurements.

51. The method of claim 50, wherein said fine timing measurement request frame comprises one or more values further specify a duration of time from transmission of an initial fine timing measurement request frame until receipt of a first fine timing measurement frame transmitted in response to the initial fine timing measurement request frame.

52. The method of claim 50, wherein the fine timing measurement request frame comprises one or more values specifying a fixed duration of time between receipt of a an acknowledgement frame at the second transceiver device and transmission of a fine timing measurement frame from the second transceiver device to the first transceiver device in response to the acknowledgement frame.

53. A first wireless station comprising:
a transceiver to wirelessly receive and wirelessly transmit frames; and
one or more processors to:
obtain a fine timing measurement request frame wirelessly received at said transceiver from a second wireless station;
initiate wireless transmission one or more messages comprising timing measurements through said transceiver to said second wireless station; and
obtain one or more messages comprising an RTT measurement computed based, at least in part, on said timing measurements wirelessly received at said transceiver from said second wireless station.

54. The first wireless station of claim 53, wherein said fine timing measurement request frame comprises one or more values to specify a duration of time from transmission of an initial fine timing measurement request frame until receipt of a first fine timing measurement frame transmitted in response to the initial fine timing measurement request frame.

55. The first wireless station of claim 53, wherein the fine timing measurement request frame comprises one or more values specifying a fixed duration of time between receipt of a an acknowledgement frame at the second wireless station and transmission of a fine timing measurement frame from the second wireless station to the first wireless station in response to the acknowledgement frame.

56. An article comprising:
a non-transitory storage medium comprising machine-readable instructions stored thereon which are executable by a special purpose computing apparatus of a first wireless station to:
obtain a fine timing measurement request frame wirelessly received from a second wireless station;
initiate wireless transmission one or more messages comprising timing measurements to said second wireless station; and
obtain one or more messages comprising a round trip time (RTT) measurement computed based, at least in part, on said timing measurements wirelessly received from said second wireless station.

57. The article of claim 56, wherein said fine timing measurement request frame comprises one or more values to specify a duration of time from transmission of an initial fine timing measurement request frame until receipt of a first fine timing measurement frame transmitted in response to the initial fine timing measurement request frame.

58. The article of claim 56, wherein the fine timing measurement request frame comprises one or more values specifying a fixed duration of time between receipt of a an acknowledgement frame at the second wireless station and transmission of a fine timing measurement frame from the second wireless station to the first wireless station in response to the acknowledgement frame.

59. An apparatus comprising:
means for wirelessly receiving from a first transceiver device a fine timing measurement request frame at a second transceiver device;
means for wirelessly transmitting, from said second transceiver device to said first transceiver device, one or more messages comprising timing measurements; and
means for wirelessly receiving, at said second transceiver device from said first transceiver device, one or more messages comprising a round trip time measurement computed based, at least in part, on said timing measurements.

* * * * *